(12) United States Patent
Atungsiri et al.

(10) Patent No.: US 11,394,592 B2
(45) Date of Patent: *Jul. 19, 2022

(54) TRANSMITTER AND METHOD OF TRANSMITTING AND RECEIVER AND METHOD OF DETECTING OFDM SIGNALS

(71) Applicant: SATURN LICENSING LLC, New York, NY (US)

(72) Inventors: Samuel Asangbeng Atungsiri, Basingstoke (GB); Gholam Hosein Asjadi, Guildford (GB)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/103,252

(22) Filed: Nov. 24, 2020

(65) Prior Publication Data

US 2021/0184905 A1    Jun. 17, 2021

Related U.S. Application Data

(60) Continuation of application No. 15/493,475, filed on Apr. 21, 2017, now Pat. No. 10,887,140, which is a
(Continued)

(30) Foreign Application Priority Data

Mar. 28, 2013  (GB) ..................................... 1305799
Jun. 5, 2013   (EP) ..................................... 13170706

(51) Int. Cl.
*H04L 27/26*    (2006.01)
*H04L 1/00*     (2006.01)
*H04L 5/00*     (2006.01)

(52) U.S. Cl.
CPC .......... *H04L 27/2602* (2013.01); *H04L 1/007* (2013.01); *H04L 1/0017* (2013.01);
(Continued)

(58) Field of Classification Search
CPC ............. H04L 27/2602; H04L 27/2607; H04L 1/0017; H04L 1/007; H04L 5/0007; H04L 5/0044

See application file for complete search history.

(56) References Cited

U.S. PATENT DOCUMENTS 6,115,354 A      9/2000  Week
7,440,506 B2 *  10/2008  Atungsiri ............ H04L 25/0216
                                                    375/260
(Continued)

FOREIGN PATENT DOCUMENTS

EP    1 971 058 A1    9/2008
EP    2 276 213 A2    1/2011
(Continued)

OTHER PUBLICATIONS

UKIPO Search Report dated Oct. 2, 2013, in UK Application No. GB1305799.7.
(Continued)

*Primary Examiner* — Sam K Ahn
*Assistant Examiner* — Amneet Singh
(74) *Attorney, Agent, or Firm* — Chris Kolefas

(57) ABSTRACT

A transmitter transmits payload data using Orthogonal Frequency Division Multiplexed (OFDM) symbols. The first OFDM symbol is a first type having a number of sub-carriers which is less than or equal to the number of sub-carriers of the one or more second OFDM symbols of a second type and a guard interval for the first OFDM symbol is selected in dependence upon the longest possible guard interval of the second OFDM symbol. Accordingly an OFDM communi-
(Continued)

cations system can be formed in which data is transmitted using a frame structure in which a guard interval is adapted to allow a mix of different types of OFDM symbols.

21 Claims, 15 Drawing Sheets

Related U.S. Application Data division of application No. 14/226,937, filed on Mar. 27, 2014, now abandoned.

(52) U.S. Cl.
CPC ........ *H04L 27/2607* (2013.01); *H04L 5/0007* (2013.01); *H04L 5/0044* (2013.01)

(56) References Cited

U.S. PATENT DOCUMENTS

| | | |
|---|---|---|
| 2005/0100118 A1 | 5/2005 | Zhang |
| 2005/0180315 A1 | 8/2005 | Chitrapu |
| 2007/0002726 A1 | 1/2007 | Zangi |
| 2007/0230600 A1 | 10/2007 | Bertrand |
| 2008/0075195 A1 | 3/2008 | Pajukoski |
| 2008/0165675 A1 | 7/2008 | Yang |
| 2009/0003308 A1 | 1/2009 | Baxley |
| 2009/0109919 A1 | 4/2009 | Bertrand |
| 2009/0110092 A1 | 4/2009 | Taylor et al. |
| 2009/0116374 A1 | 5/2009 | Henriksson |
| 2009/0125780 A1 | 5/2009 | Taylor et al. |
| 2009/0280738 A1 | 11/2009 | Kim |
| 2010/0034219 A1 | 2/2010 | Stadelmeier |
| 2010/0144306 A1 | 6/2010 | Karr |
| 2010/0158047 A1 | 6/2010 | Lee |
| 2010/0195668 A1 | 8/2010 | Robert et al. |
| 2010/0310022 A1 | 12/2010 | Asjadi |
| 2010/0329383 A1 | 12/2010 | Moon |
| 2011/0013706 A1 | 1/2011 | Raaf |
| 2011/0013732 A1 | 1/2011 | Atungsiri |
| 2011/0096867 A1* | 4/2011 | Kang .................. H04L 5/0007 375/295 |
| 2011/0181408 A1 | 7/2011 | Greenis |
| 2011/0211632 A1 | 9/2011 | Yun |
| 2011/0274204 A1 | 11/2011 | Ko et al. |
| 2011/0280327 A1 | 11/2011 | Ko et al. |
| 2011/0305286 A1 | 12/2011 | Shimezawa et al. |
| 2012/0213255 A1 | 8/2012 | Stadelmeier |
| 2013/0201931 A1 | 8/2013 | Noh |
| 2014/0134970 A1 | 5/2014 | Pazos |
| 2014/0294124 A1 | 10/2014 | Atungsiri |

FOREIGN PATENT DOCUMENTS

| | | |
|---|---|---|
| EP | 2 362 650 A1 | 8/2011 |
| WO | WO 2011/104142 A1 | 9/2011 |
| WO | WO 2014/155104 A1 | 10/2014 |

OTHER PUBLICATIONS

Digital Video Broadcasting (DVB); Frame structure channel coding and modulation for a second generation digital terrestrial television broadcasting system (DVB-T2), ETSI EN 302755 (DVB-T2) V1.3.1 (2012-14), 188 pages.

"Digital Video Broadcasting (DVB); Implementation Guidelines for a second generation digital cable transmission system (DVB-C2)" ETSI TS 102 991 V1 .2.1 (Jun. 2011) (Year: 2011).

\* cited by examiner

Generation of Gold codes for signature sequence

AWGN performance of preamble protection codes

Preamble Tg should be at least max Tg for all FFT

Alternative coarse frequency offset synchroniser

Differential Encoder

Signature matched filter for frame synchronisation

Matched filter output for multipath channel

Matched filter output for multipath channel

Pilot correlation result for frequency offset = -88/Tu

AWGN performance of composite preamble symbol

Multipath (2 paths) channel mode

TRANSMITTER AND METHOD OF TRANSMITTING AND RECEIVER AND METHOD OF DETECTING OFDM SIGNALS

CROSS REFERENCE TO RELATED APPLICATIONS

This application is a continuation Application of U.S. application Ser. No. 15/493,475, filed Apr. 21, 2017, which is a divisional Application of U.S. application Ser. No. 14/226,937, filed Mar. 27, 2014, which claims priority to United Kingdom Application Number 1305799.7, filed Mar. 28, 2013, and European Patent Office Application Number 13170706.9 filed Jun. 5, 2013. The entire contents of the above-identified applications are incorporated herein by reference.

FIELD OF THE DISCLOSURE

The present disclosure relates to transmitters and methods of transmitting payload data using Orthogonal Frequency Division Multiplexed (OFDM) symbols.

BACKGROUND OF THE DISCLOSURE

There are many examples of radio communication systems in which data is communicated using Orthogonal Frequency Division Multiplexing (OFDM). Systems which have been arranged to operate in accordance with Digital Video Broadcasting (DVB) standards for example, use OFDM. OFDM can be generally described as providing K narrow band sub-carriers (where K is an integer) which are modulated in parallel, each sub-carrier communicating a modulated data symbol such as Quadrature Amplitude Modulated (QAM) symbol or Quadrature Phase-shift Keying (QPSK) symbol. The modulation of the sub-carriers is formed in the frequency domain and transformed into the time domain for transmission. Since the data symbols are communicated in parallel on the sub-carriers, the same modulated symbols may be communicated on each sub-carrier for an extended period, which can be longer than the coherence time of the radio channel. The sub-carriers are modulated in parallel contemporaneously, so that in combination the modulated carriers form an OFDM symbol. The OFDM symbol therefore comprises a plurality of sub-carriers each of which has been modulated contemporaneously with different modulation symbols. During transmission, a guard interval filled by a cyclic prefix of the OFDM symbol precedes each OFDM symbol. When present, the guard interval is dimensioned to absorb any echoes of the transmitted signal that may arise from multipath propagation or other transmitters transmitting the same signal from a different geographic location.

As indicated above, the number of narrowband carriers K in an OFDM symbol can be varied depending on operational requirements of a communications system. The guard interval represents overhead and so may be minimized as a fraction of the OFDM symbol duration in order to increase spectral efficiency. For a given guard interval fraction, the ability to cope with increased multipath propagation whilst maintaining a given spectral efficiency can be improved by increasing the number K of sub-carriers thereby increasing the duration of the OFDM symbol. However, there can also be a reduction in robustness in the sense that it may be more difficult for a receiver to recover data transmitted using a high number of sub-carriers compared to a smaller number of sub-carriers, because for a fixed transmission bandwidth, increasing the number of sub-carriers K also means reducing the bandwidth of each sub-carrier. A reduction in the separation between sub-carriers can make demodulation of the data from the sub-carriers more difficult for example, in the presence of Doppler frequency shifts. That is to say that although a larger number of sub-carriers (high order operating mode) can provide a greater spectral efficiency, for some propagation conditions, a target bit error rate of communicated data may require a higher signal to noise ratio to achieve than required for a lower number of sub-carriers.

SUMMARY OF DISCLOSURE

According to an aspect of the present disclosure there is provided a transmitter transmits payload data using Orthogonal Frequency Division Multiplexed (OFDM) symbols. The transmitter comprises a frame builder configured to receive the payload data to be transmitted and to receive signalling data for use in detecting and recovering the payload data at a receiver, and to form the payload data with the signalling data into frames for transmission. A modulator is configured to modulate a first OFDM symbol with the signalling data forming a part of each of the frames and to modulate one or more second OFDM symbols with the payload data to form one or more of the frames, and a transmission unit for transmitting the first and second OFDM symbols. The first OFDM symbol is a first type having a number of sub-carriers which is less than or equal to the number of sub-carriers of the one or more second OFDM symbols of a second type and a guard interval for the first OFDM symbol is selected in dependence upon the longest possible guard interval of the second OFDM symbol. Accordingly an OFDM communications system can be formed in which data is transmitted using a frame structure in which a guard interval is adapted to allow a mix of different types of OFDM symbols. The mix of OFDM symbols allows the signalling data to be carried by the OFDM symbol of the first type and the payload data to be carried by the OFDM symbol of the second type, and the number of sub-carriers of the OFDM symbols of first type carrying the signalling data is less than or equal to the number of sub-carriers of the OFDM symbol of the second type. If the number of sub-carriers of the OFDM symbol of the first type is less than the number of OFDM symbols of the second type then there is an improved likelihood of the signalling data being detected and recovered before the payload data, so that a more robust communications system can be formed.

According to an arrangement in which embodiments of the present disclosure find application there is a requirement to provide a "preamble" OFDM symbol in a transmission frame, which carries signalling parameters to indicate, for example, at least some of the communications parameters which were used to encode and to modulate payload data onto the data bearing OFDM symbols whereby after detecting the signalling data within the first (preamble) OFDM symbol the receiver can recover the transmission parameters in order to detect the payload data from the data bearing OFDM symbols.

In the following description the first OFDM symbol may be a preamble OFDM symbol or form part of one in a transmission frame and so may be referred to as a preamble OFDM symbol and because this is arranged to carry signalling data, it may be referred to as a signalling OFDM symbol.

According to one embodiment a number of sub-carriers used for the OFDM symbols carrying signalling data may be different from the number of sub-carriers used for the OFDM symbols which are used to carry the payload data. For example in order to improve a likelihood of recovering the signalling data, making it more robust for detection in more challenging radio environments the number of sub-carriers may be smaller than for the OFDM symbols carrying payload data. For example, the payload data bearing OFDM symbols may be required to have a high spectral efficiency and therefore for example the number of sub-carriers may be 16 k (16384) or 32 k (32768) whereas in order to improve a likelihood that a receiver can recover the signalling data from the signalling OFDM symbols, the number of sub-carriers for the first signalling OFDM symbol may be a lower number, for example, a 4 k (4096) or 8 k (8192).

Various further aspects and features of the disclosure are defined in the appended claims.

BRIEF DESCRIPTION OF THE DRAWINGS

Embodiments of the present disclosure will now be described by way of example only with reference to the accompanying drawings wherein like parts are provided with corresponding reference numerals and in which:

FIG. 17 is a schematic block diagram illustrating a circuit for detecting a coarse frequency offset in the receiver of FIG. 11a;

DESCRIPTION OF EXAMPLE EMBODIMENTS

Embodiments of the present disclosure can be arranged to form a transmission network for transmitting signals representing data including video data and audio data so that the transmission network can, for example, form a broadcast network for transmitting television signals to television receiving devices. In some examples the devices for receiving the audio/video of the television signals may be mobile devices in which the television signals are received while on the move. In other examples the audio/video data may be received by conventional television receivers which may be stationary and may be connected to a fixed antenna or antennas.

Television receivers may or may not include an integrated display for television images and may be recorder devices including multiple tuners and demodulators. The antenna(s) may be inbuilt to television receiver devices. The connected or inbuilt antenna(s) may be used to facilitate reception of different signals as well as television signals. Embodiments of the present disclosure are therefore configured to facilitate the reception of audio/video data representing television programs to different types of devices in different environments.

As will be appreciated, receiving television signals with a mobile device while on the move may be more difficult because radio reception conditions will be considerably different to those of a conventional television receiver whose input comes from a fixed antenna.

Figure 1:
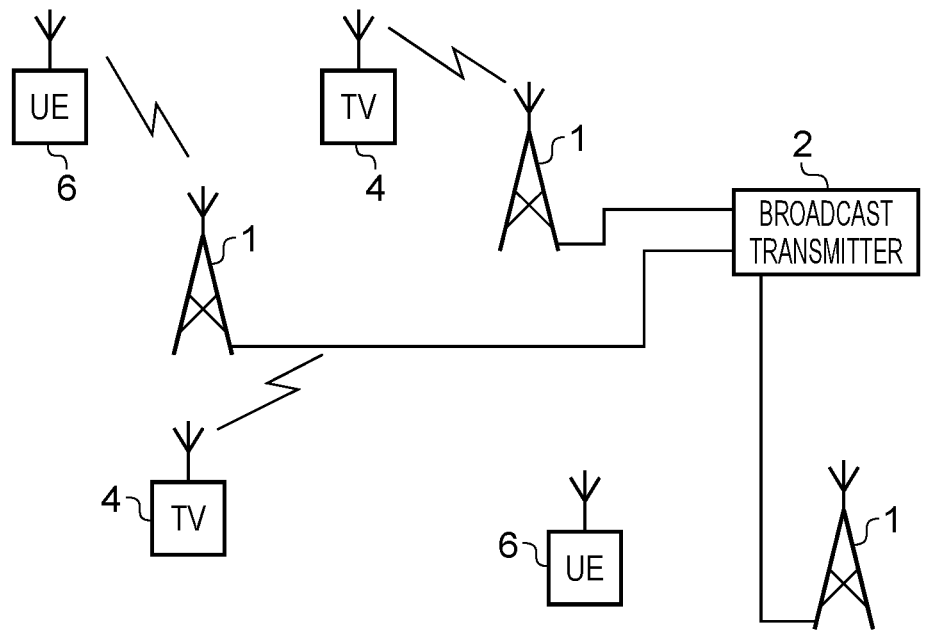
FIG. 1 is a schematic diagram illustrating an arrangement of a broadcast transmission network.

An example illustration of a television broadcast system is shown in FIG. 1. In FIG. 1 broadcast television base stations 1 are shown to be connected to a broadcast transmitter 2. The broadcast transmitter 2 transmits signals from base stations 1 within a coverage area provided by the broadcast network. The television broadcast network shown in FIG. 1 operates as a so called single frequency network in which each of the television broadcast base stations 1 transmit the radio signals conveying audio/video data contemporaneously so that these can be received by television receivers 4 as well as mobile devices 6 within a coverage area provided by the broadcast network. For the example shown in FIG. 1 the signals transmitted by the broadcast base stations 1 are transmitted using Orthogonal Frequency Division Multiplexing (OFDM) which can provide an arrangement for transmitting the same signals from each of the broadcast stations 2 which can be combined by a television receiver even if these signals are transmitted from different base stations 1. Provided a spacing of the broadcast base stations 1 is such that the propagation time between the signals transmitted by different broadcast base stations 1 is less than or does not substantially exceed a guard interval that precedes the transmission of each of the OFDM symbols then a receiver device 4, 6 can receive the OFDM symbols and recover data from the OFDM symbols in a way which combines the signals transmitted from the different broadcast base stations 1. Examples of standards for broadcast networks that employ OFDM in this way include DVB-T, DVB-T2 and ISDB-T.

Figure 2:
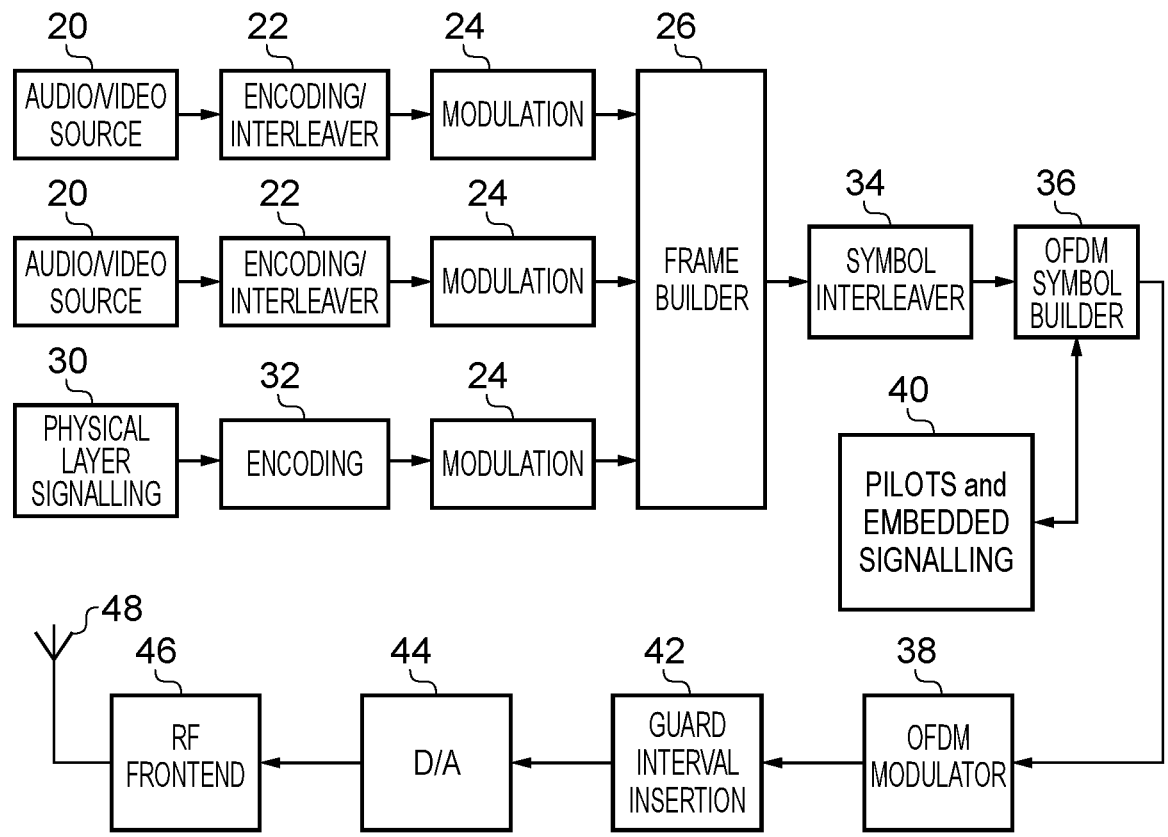
FIG. 2 is a schematic block diagram illustrating an example transmission chain for transmitting broadcast data via the transmission network of FIG. 1.

An example block diagram of a transmitter forming part of the television broadcast base stations 1 for transmitting data from audio/video sources is shown in FIG. 2. In FIG. 2 audio/video sources 20 generate the audio/video data representing television programmes. The audio/video data is encoded using forward error correction encoding by an encoding/interleaver block 22 which generates forward error correction encoded data which is then fed to a modulation unit 24 which maps the encoded data onto modulation symbols which are used to modulate OFDM symbols. Depicted on a separate lower arm, signalling data providing physical layer signalling for indicating for example the format of coding and modulation of the audio/video data is generated by a physical layer signalling unit 30 and after being encoded by an encoding unit 32 the physical layer signalling data is then modulated by a modulation unit 24 as with the audio/video data.

A frame builder 26 is arranged to form the data to be transmitted with the physical layer data into a frame for transmission. The frame includes a time divided section having a preamble in which the physical layer signalling is transmitted and one or more data transmission sections which transmit the audio/video data generated by the audio/video sources 20. A symbol interleaver 34 may interleave the data which is formed into symbols for transmission before being modulated by an OFDM symbol builder 36 and an OFDM modulator 38. The OFDM symbol builder 36 receives pilot signals which are generated by a pilot and embedded data generator 40 and fed to the OFDM symbol builder 36 for transmission. An output of the OFDM modulator 38 is passed to a guard insertion unit 42 which inserts a guard interval and the resulting signal is fed to a digital to analogue convertor 44 and then to an RF front end 46 before being transmitted by an antenna 48.

Figure 3:
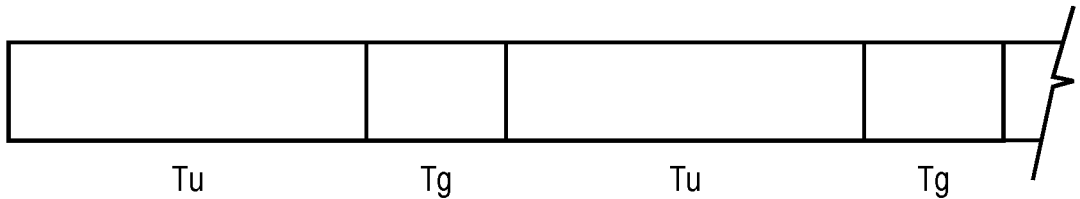
FIG. 3 is a schematic illustration of OFDM symbols in the time domain which include a guard interval.

As with a conventional arrangement OFDM is arranged to generate symbols in the frequency domain in which data symbols to be transmitted are mapped onto sub carriers which are then converted into the time domain using an inverse Fourier Transform. Thus the data to be transmitted is formed in the frequency domain and transmitted in the time domain. As shown in FIG. 3 each time domain symbol is generated with a useful part of duration Tu and a guard interval of duration Tg. The guard interval is generated by copying a part of the useful part of the symbol in the time domain. By correlating the useful part of the burst with the guard interval, a receiver can be arranged to detect the useful part of the OFDM symbol Tu, from which data can then be recovered from an OFDM symbol by triggering a Fast Fourier Transform to convert the time domain symbol samples into the frequency domain. Such a receiver is shown in FIG. 4.

Figure 4:
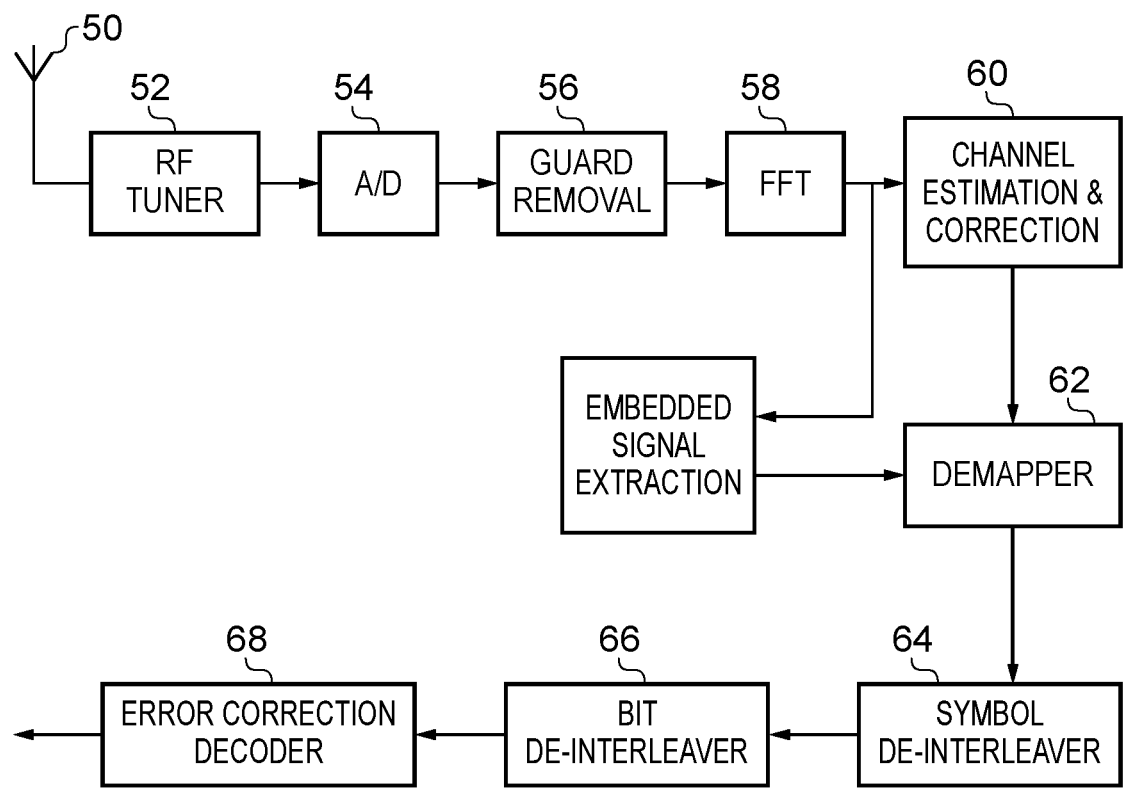
FIG. 4 is a schematic block of a typical receiver for receiving data broadcast by the broadcast transmission network of FIG. 1 using OFDM.

In FIG. 4 a receiver antenna 50 is arranged to detect an RF signal which is passed via a tuner 52 and converted into a digital signal using an analogue to digital converter 54 before the guard interval is removed by a guard interval removal unit 56. After detecting the optimum position for performing a fast Fourier Transform (FFT) to convert the time domain samples into the frequency domain, an FFT unit 58 transforms the time domain samples to form the frequency domain samples which are fed to a channel estimation and correction unit 60. The channel estimation and correction unit 60 then estimates the transmission channel for example by using pilot sub-carriers which have been embedded into the OFDM symbols. After excluding the pilot sub-carriers, all the data-bearing sub-carriers are fed to a symbol de-interleaver 64 which de-interleaves the sub-carrier symbols. A de-mapper unit 62 then extracts the data bits from the sub-carriers of the OFDM symbol. The data bits are fed to a bit de-interleaver 66, which performs the de-interleaving so that the error correction decoder can correct errors in accordance with a conventional operation.

Framing Structure

Figure 5:
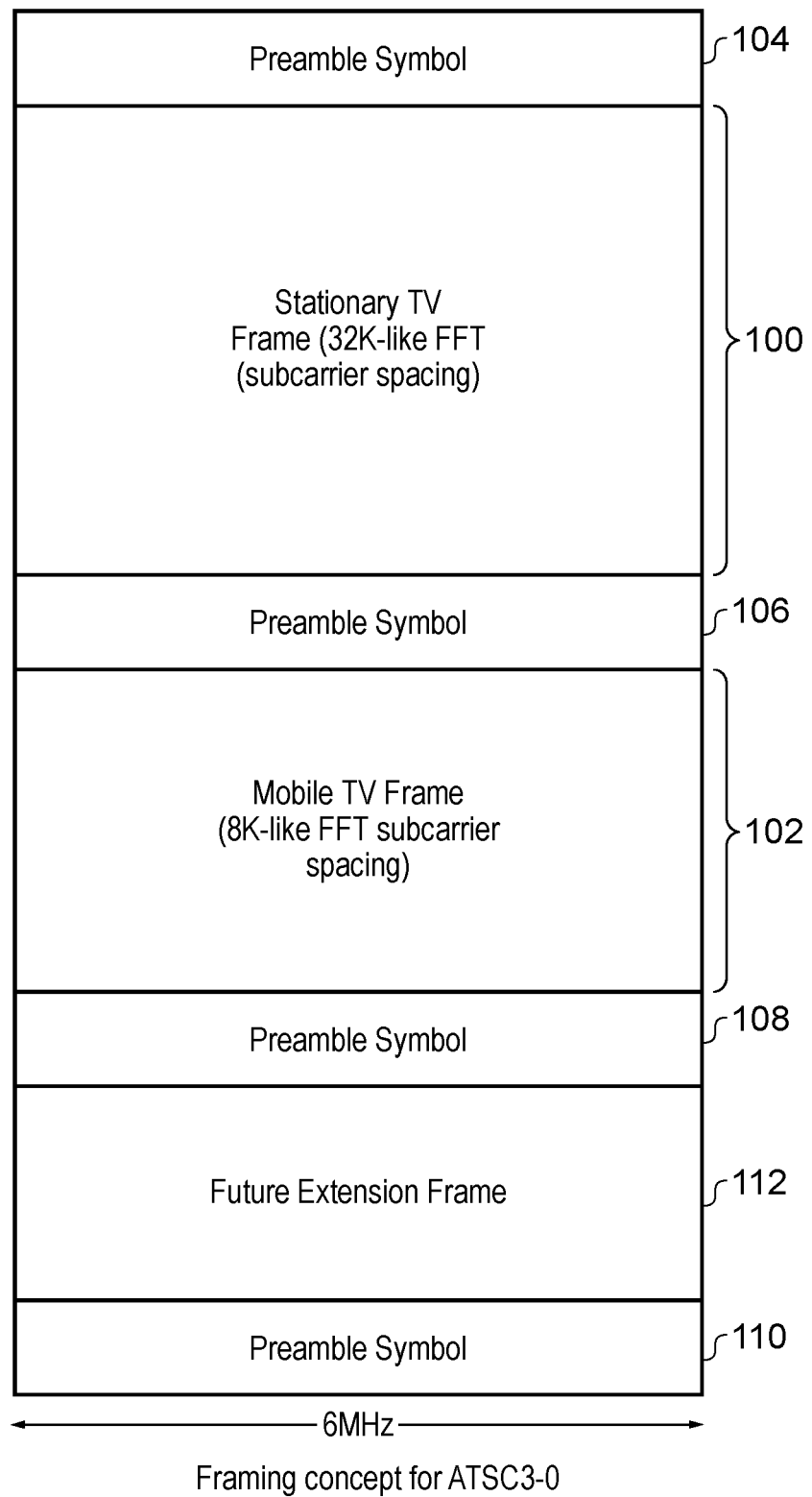
FIG. 5 is a schematic illustration of a transmission frame for transmitting broadcast data including payload data and signalling data.

FIG. 5 shows a schematic of the framing structure according to an example embodiment of the present technique. FIG. 5 illustrates different physical layer frames, some targeted for mobile reception whilst others are targeted for fixed roof-top antenna reception. The system can be expanded in future to incorporate new types of frames, for the current system, these potential new types of frames are simply known as future extension frames (FEFs).

One requirement for fixed reception frames is an improved spectral efficiency which may be assured by such features as adopting a higher order modulation, for example 256QAM, and higher code rates, for example greater than half rate, because of relatively benign channel conditions, and a high number of sub-carriers per OFDM symbol (FFT size) such as 32K. This reduces the capacity loss due to the guard interval fraction. However, a higher number of sub-carriers can make such OFDM symbols unsuitable for mobile reception because of lower tolerance to high Doppler frequency of the received signal. On the other hand, the main requirement for mobile reception frames could be robustness in order to ensure a high rate of service availability. This can be improved by adopting such features as a low order modulation for example QPSK or BPSK, low code rates, a low number of sub-carriers per OFDM symbol (FFT size) and a high density scattered pilot pattern etc. A low number of sub-carriers for OFDM symbols can be advantageous for mobile reception because a lower number of sub-carriers can provide a wider sub-carrier spacing and so more resilience to high Doppler frequency. Furthermore a high density pilot pattern eases channel estimation in the presence of Doppler.

The framing structure shown in FIG. 5 is therefore characterised by frames which may each include payload data modulated and encoded using different parameters. This may include for example using different OFDM symbol types having different number of sub-carriers per symbol, which may be modulated using different modulation schemes, because different frames may be provided for different types of receiver. However each frame may include at least one OFDM symbol carrying signalling data, which may have been modulated differently to the one or more OFDM symbols carrying the payload data. Furthermore the signalling OFDM symbol may be a different type to the OFDM symbol(s) carrying the payload data. The signalling data is required to be recovered so that the payload data may be de-modulated and decoded.

What Characteristics for the Preamble?

To delimit frame boundaries, a frame preamble symbol such as the P1 symbol in DVB-T2 is required. The preamble symbol would carry signalling that describes how the following frame is built. It is expected that all of the types of receiver mentioned above whether mobile or with a fixed antenna should be able to detect and decode the preamble in order to determine whether or not they should decode the payload in the following frame. Desirable characteristics for such a preamble include:

1. High Capacity of Signalling; The preamble should have a high signalling capacity—unlike the P1 preamble in DVB-T2 with capacity of 7 signalling bits, a preamble more like in DVB-C2 with 100s of signalling bits is desirable. This suggests that the preamble symbol should be an OFDM symbol with enough sub-carriers to carry all the signalling information.
2. Common Macro-structure; All frame preambles should have a common pre-defined macro-structure that is understood by all receiver types. This means that the preamble symbol should have for example a constant duration, constant number of sub-carriers and guard interval for all frame types. This forces a constraint that the guard interval must be similar in duration to the longest guard interval that may be used in fixed antenna reception, otherwise when the network uses this longest guard interval, the preamble symbol will suffer from excessive inter-symbol interference (ISI) and perhaps suffer decoding failure.
3. Low complexity detection and decoding: The preamble symbol detection and decoding complexity should be low enough to easily implement in battery powered mobile receivers so as to make efficient use of limited stored power. This constrains the maximum FFT size and maximum FEC block length.
4. The preamble should be easily detected in the time domain; in DVB-C2, all OFDM symbols within the frame structure use 4K subcarrier spacing. This means that the receiver can start with OFDM symbol time synchronisation followed by frequency domain frame synchronisation (preamble detection). In an embodiment of the present disclosure frames can be arranged such that OFDM symbols in different physical layer frames may have difference subcarrier spacing. Frequency domain frame synchronisation (preamble detection) is thus not readily possible. The preamble symbol must therefore be detected in the time domain. It is only after the preamble is decoded and its signalling payload interpreted that frequency domain processing of the frame can proceed because only then would the receiver have knowledge of the OFDM parameters (number of sub-carriers, guard interval) etc of the data payload bearing OFDM symbols in the body of the frame.
5. Robustness; The preamble should be detectable and decodable by all receiver types under all channel conditions where such receivers are expected to work. This means that the preamble should be robust to both high levels of noise, low signal to noise ratios and high levels of Doppler shift as experienced during reception on the move. Robustness to high levels of noise constrains the maximum transmission parameters for coding and modulation (MODCOD) that can be used for carrying the signalling payload of the preamble whilst robustness to Doppler constrains the minimum sub-carrier spacing of the preamble OFDM symbol. The preamble OFDM symbol must use a sub-carrier spacing that is large enough to be reasonably resilient to a high Doppler spread. Furthermore, the preamble OFDM symbol should also allow decoding in the presence of frequency shift, common phase error, maximum expected multipath delay spreads etc.

As explained above the preamble OFDM symbol conveys signalling data whilst the OFDM symbols within the body of the transmission frame convey payload data as shown in FIG. 5. Each transmission frame shown in FIG. 5 has particular characteristics. A data bearing frame 100 carries a frame of data, which may use a higher operating mode providing a higher number of sub-carriers per OFDM symbol, for example, approximately 32 thousand sub-carriers (32 k mode) thereby providing a relatively high spectral efficiency, but requiring a relatively high signal to noise ratio to achieve an acceptable data integrity in the form of the bit error rate. The higher order operating mode would therefore be most suitable to communicate to stationary television receivers which have sensitive detection capabilities including well positioned fixed antenna for recovering audio/video data from the 32 k OFDM symbols. In contrast, the frame structure also includes a second frame 102 which is generated to be received by mobile television receivers in a more hostile radio communications environment. The frame 102 may therefore be arranged to form payload bearing OFDM symbols with a lower order modulation scheme such as BPSK or QPSK and a small or lower number of sub-carriers per OFDM symbol (FFT size) such as 4K or 8K to improve the likelihood that a mobile receiver may be able to receive and recover the audio/video data in a relatively hostile environment. In both the first frame 100 and the second frame 102 a preamble symbol 104,106 is provided which provides signalling parameters for detecting the audio/video data transmitted in the payload part of the transmission frame 100, 102. Similarly, a preamble symbol 108, 110 is provided for a future extension frame 112.

Design of New Preamble Symbol

Some example embodiments can provide an arrangement for forming a preamble symbol for use for example with the transmission frames shown in FIG. 5 in which there is an improved likelihood of detecting the preamble symbol particularly in harsh radio environments. Furthermore, the framing structure shown in FIG. 5 can be devised such that the number of sub-carriers of the payload bearing OFDM symbols is different from frame to frame and furthermore, these sub-carriers may use different modulation schemes. Thus the OFDM symbols which carry the payload data may be of a different type to the OFDM symbols carrying the signalling data. An example block diagram of a part of the transmitter shown in FIG. 2 for transmitting the signalling data is shown in FIG. 6.

Figure 6:
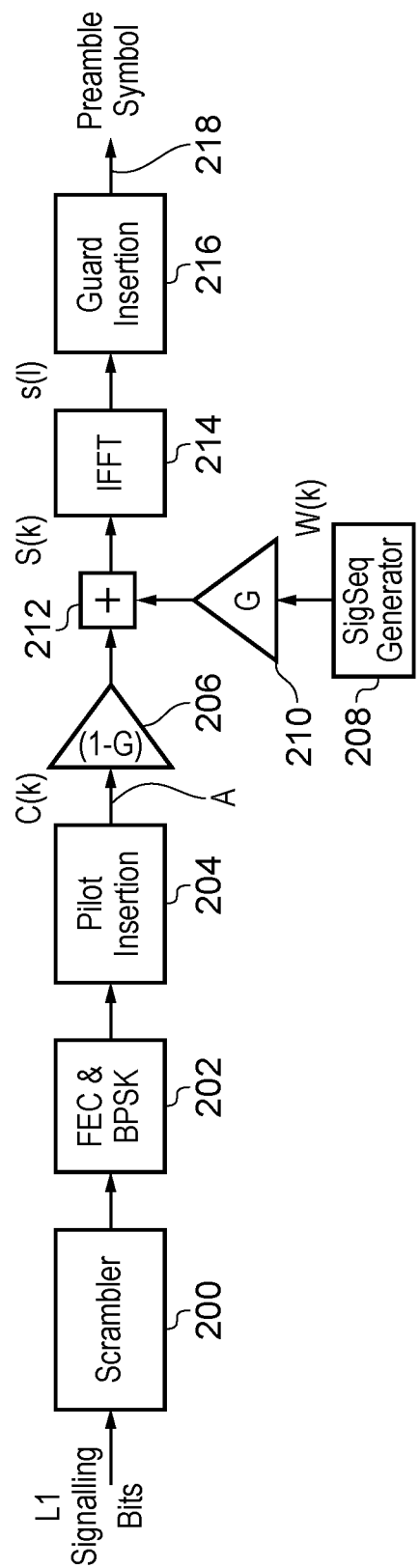
FIG. 6 is a block diagram showing a transmitter for transmitting signalling data via a signalling or preamble OFDM symbol according to one embodiment.

In FIG. 6 the signalling data is first fed to a scrambling unit 200 which scrambles the signalling data which is then fed to a forward error correction (FEC) and modulator unit 202 which encodes the signalling data with a forward error correcting code and then interleaves it before mapping the encoded data onto a low order modulation constellation such as BPSK, DBPSK, π/4-BPSK and QPSK. A pilot insertion unit 204 then inserts pilots between modulation symbols to form one of the OFDM symbols of the preamble 104, 106, 108, 110. The OFDM symbol forming the preamble is then scaled by a scaling unit 206 in accordance with a predetermined factor (1−G). The scaling unit 206 adapts the transmission power of the preamble with respect to a signature sequence which is combined with the OFDM symbol of the preamble before transmission so that the total transmission power of the preamble remains the same as it would have been without the signature sequence.

According to the present the technique a signature sequence generator 208 is configured to generate a signature sequence which is fed to a second scaling unit 210 which scales the signature sequence by a predetermined factor G before the scaled signature sequence is combined with the OFDM symbol of the preamble by a combining units 212. Thus the signature sequence W(k) is combined with the OFDM symbol in the frequency domain so that each of the coefficients of the signature sequence is added to one of the subcarrier signals of the OFDM symbol. The combined preamble OFDM symbol and signature sequence are then transformed from the frequency domain to the time domain by an inverse Fourier transform processor (IFFT) 214 before a guard interval insertion unit inserts a time domain guard interval. At an output of the guard insertion unit 216 the preamble symbol is formed on output channel 218.

As can be seen for the example shown in FIG. 6 the signature sequence is combined with the OFDM symbol carrying signalling data in the frequency domain so that a spectrum of the preamble symbol after combining remains within a spectral mask for the transmission channel. As will be appreciated for some examples the signature sequence may be combined with the OFDM symbol in the time domain. However other bandwidth limiting processes must then be introduced after the combination of the signature sequence with the preamble OFDM symbol in the time domain which may affect the correlation properties of the signature sequence at the receiver.

In the example illustration in FIG. 6, the scrambling of the signalling data by the scrambling unit 200 ensures that the peak-to-average power ratio (PAPR) of the preamble symbol will not be excessive due to many similarly modulated OFDM sub-carriers. The scrambled signalling bits are then forward error correction encoded by the FEC and BPSK unit 202 with a code such as 4K LDPC code at a low code rate (1/4 or 1/5) prior to mapping a low order modulation constellation such as BPSK, DBPSK, π/4-BPSK and QPSK within the unit 202. The pilots inserted at this stage by the pilot insertion unit 204 are not for channel estimation, but for frequency offset estimation as will be explained shortly. At this stage, a complex preamble signature sequence also composed of the same number of complex samples as the useful sub-carriers as the OFDM symbol is added to the samples of the signalling OFDM symbol by the combiner 212. When generated, each preamble signature sequence sample is a point on the unit circle but before addition to the preamble OFDM symbol, each sample is scaled by a predetermined factor G, by a scaler 210 and the corresponding OFDM symbol sample is scaled by (1-G) by a scaler 206 so that the power of the composite preamble symbol should be the same as the power of the signalling OFDM symbol at point A in FIG. 6.

The IFFT 214 then forms the OFDM symbol in the time domain, which is then followed by the insertion of the guard interval by the guard insertion unit 216 which prepends the Ng samples of the preamble OFDM symbol at the start of the preamble OFDM symbol—also known as the cyclic prefix of the preamble OFDM symbol. After guard interval insertion, a preamble OFDM time domain symbol of duration Ts=Tu+Tg made up of Ns=Nu+Ng complex samples where Tu is the useful symbol period with Nu samples and Tg is the guard interval duration with Ng samples is formed.

The Signature Sequence Generator

As explained above, the preamble symbol generator of FIG. 6 generates a signature sequence which is combined with the signalling OFDM symbol (first OFDM symbol), which forms the preamble symbol of the frame, in order to allow a receiver to detect the preamble at lower signal to noise ratios compared to signal to noise ratios which are required to detect and recover data from OFDM symbols carrying the payload data. The signature sequence generated by the signature sequence generator 208 can be formed using two pseudo random sequence generators, one for the in-phase and other for the quadrature phase component. In one example the signature sequence is a constant amplitude zero autocorrelation (CAZAC) or Zadoff and Chu sequence. In other examples the signature sequence is formed from a pair of Gold code sequences chosen because of their good auto-correlation properties, or other example signature sequence could be used such as from a pair of M-sequences.

Figure 7:
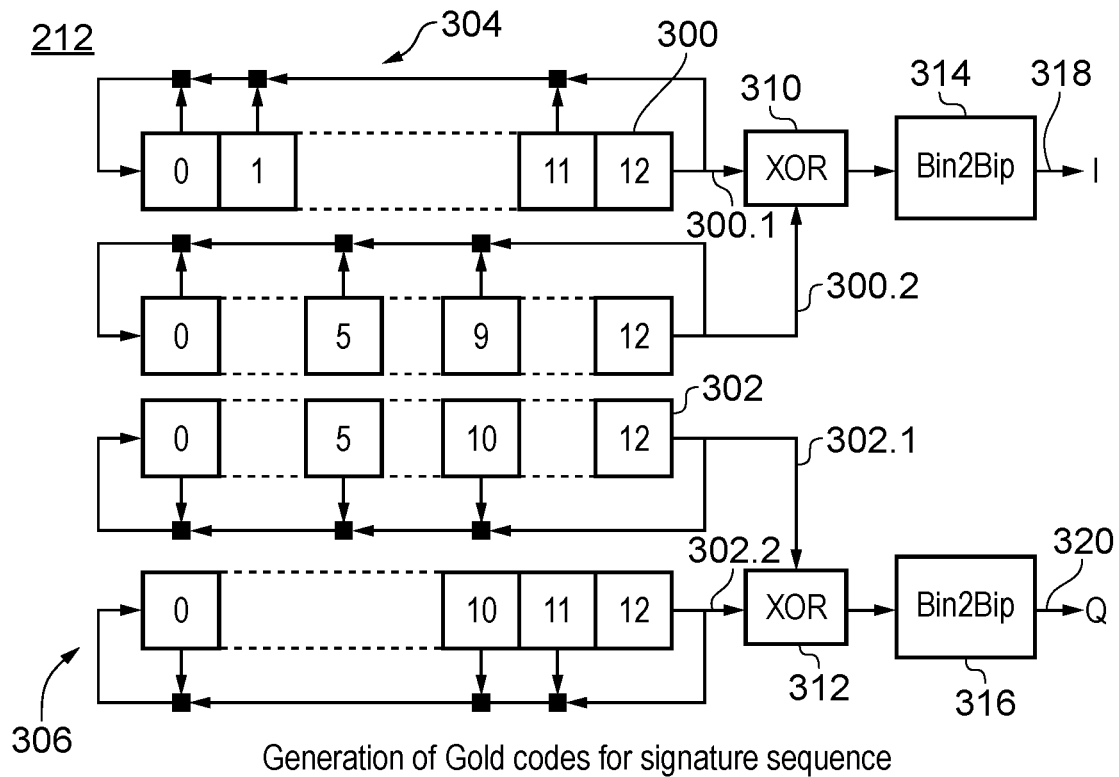
FIG. 7 is a schematic block diagram of a signature sequence generator according to one embodiment.

One example of the signature sequence generator 208 shown in FIG. 6 is shown in more detail in FIG. 7. FIG. 7 is arranged to generate a complex signature sequence which is added to the complex samples of the signalling OFDM symbol by the combiner 212 shown in FIG. 6.

In FIG. 7 two linear feedback shift registers are used in each case to generate a pair of pseudo random bit sequences for the in-phase 300.1 and 300.2 and quadrature 302.1 and 302.2 components. In each case, the pseudo-random bit sequence pair is combined using exclusive-OR circuits 310, 312 to produce the Gold sequences for the in-phase (300.1 and 300.2) and quadrature (302.1 and 302.2) part of the signature sequence, respectively. A binary to bipolar mapper unit 314, 316 then forms respectively a sample for the in-phase 318 and quadrature (imaginary) 320 components of the signature sequence. Effectively, the arrangement shown in FIG. 7 generates Gold codes formed by XORing two m-sequences. The m-sequences are generated by the linear feedback shift registers 300, 302. A table 1 below shows the generator polynomials for the linear feedback shift registers according to the example shown in FIG. 7:

TABLE 1

Generator polynomials for complex signature sequence.

| Sequence Name | Generator polynomial |
|---|---|
| R_seq1 | $x^{13} + x^{11} + x + 1$ |
| R_seq2 | $x^{13} + x^{9} + x^{5} + 1$ |
| I_seq1 | $x^{13} + x^{10} + x^{5} + 1$ |
| I_seq2 | $x^{13} + x^{11} + x^{10} + 1$ |

Determining an Optimum Value for the Scaling Factor G

As shown in FIG. 6, the scaler 210 multiplies the signature sequence by a factor G and the scaler 206 multiplies the signalling OFDM symbol by a factor 1−G. As such, if the time domain signalling OFDM symbol signal is c(n) while the signature sequence signal is f(n), then the composite transmitted preamble symbol s(n) is given by:

$$s(n)=(1-G)c(n)+Gf(n)$$

where G is the scaling applied to the signature sequence. The signature signal effectively adds distortion to the signalling OFDM symbol thereby increasing the bit error rate of the signalling OFDM symbol at the receiver. Furthermore, with a normalised power of 1, the composite symbol in effect distributes power between the signature signal and the signalling OFDM symbol signal. With a high value for G, the signature signal has more power and so frame synchronisation (detection of the preamble) at the receiver should be achieved at a lower signal to noise ratio. However, reducing the power of the signalling OFDM symbol (in order to increase the power of the signature signal) also means that error-free decoding of the signalling information itself becomes more difficult at the receiver as the signal-to-noise of the signalling OFDM symbol has fallen. Therefore, an optimum value for G has to be a compromise between these conflicting aims. We can further define P=(1−G)/G which is proportional to the power ratio between the signalling OFDM symbol and the signature signal. An appropriate value for G can be set by experimenting with this power ratio P.

Figure 8:
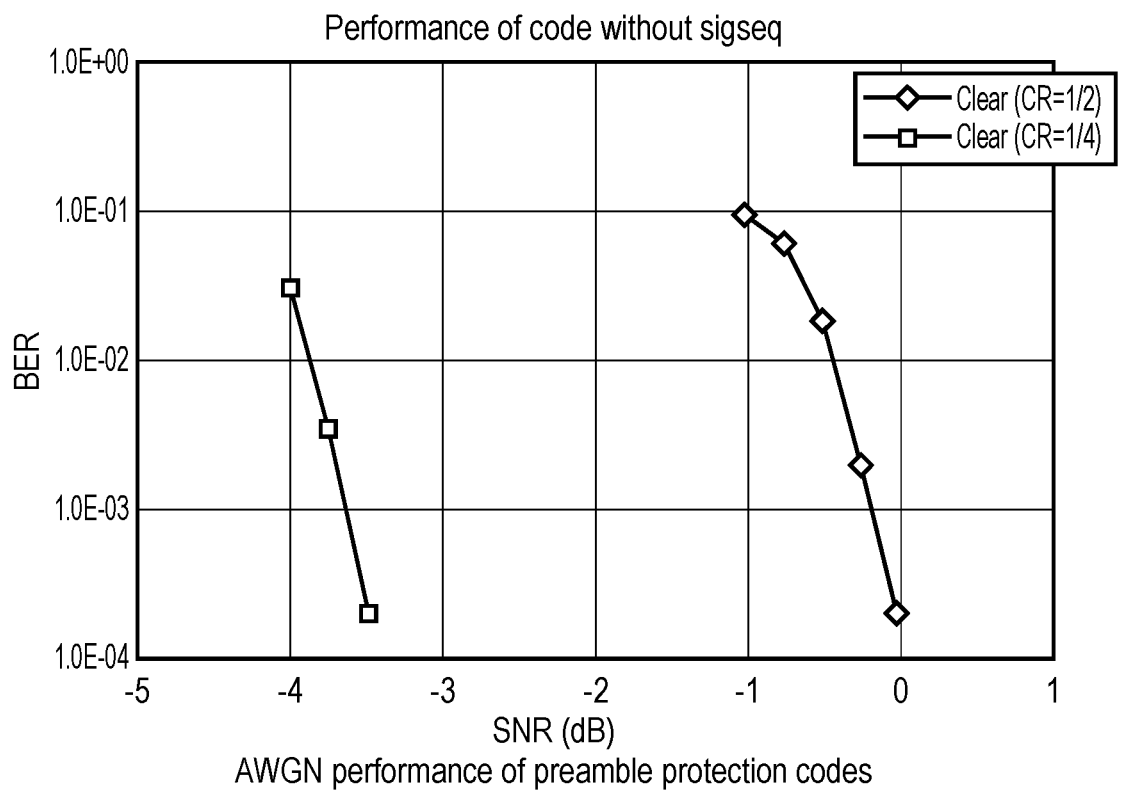
FIG. 8 is a graphical plot of bit error rate with respect to signal to noise ratio in the presence of additive white Gaussian noise for coding rates of one half and one quarter.

The performance of example error correction codes which may be used for protecting the preamble symbol can be assessed in the presence of Additive White Gaussian Noise, using an appropriate constellation for the signalling information. For example a QPSK modulation scheme can be used with example error correction codes. In the present example 4K LDPC half rate and quarter rate codes were evaluated. FIG. 8 provides a graphical illustration of the performance for communicating the signalling data using the signalling OFDM symbol for these half and quarter rate LDPC codes and shows for each code a bit error rate performance with respect to signal to noise ratios for an additive white Gaussian noise channel. It can be seen that at a signal to noise ratio of −3 dB and a signal to noise ratio of 1 dB, the quarter rate and half rate codes respectively each become error free. These values of signal to noise ratios were then increased to −2 dB and 2 dB respectively and then the signature signal added with values of P varied until a bit error rate of zero was achieved.

As will be appreciated the error correction code which may be used to protect the signalling data carried in the preamble symbol may have coding rates which are different to rate one-half and rate one-quarter. In some embodiments the coding rate is less than or equal to one-quarter. In one example the coding rate is one-fifth (⅕).

Figure 9:
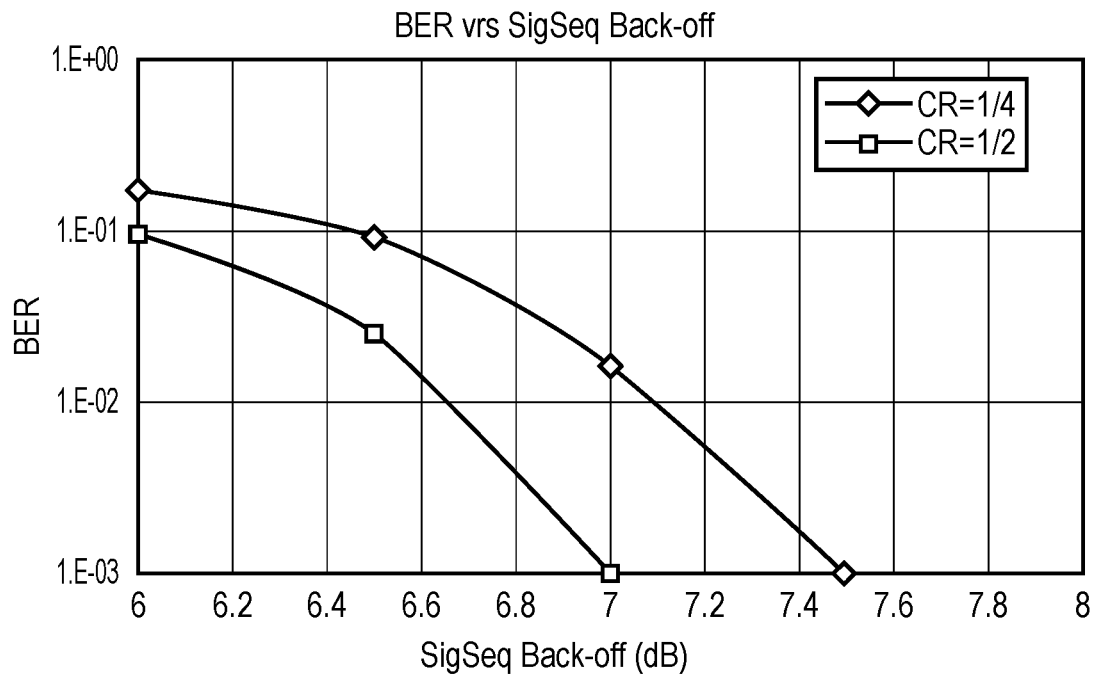
FIG. 9 is a graphical plot of bit error rate with respect to a signature sequence back-off power from the power of the modulated signalling data which provides an acceptable performance according to the results of FIG. 8.

FIG. 9 provides a graphical plot for code rates of one quarter and one half showing a bit error rate for each code rate as the factor P on the x-axis and SNR fixed to −2 dB and 2 dB respectively. As can be seen from these results setting P=8 dB will give a bit error rate close to zero, despite the presence of the signature sequence, which has been added to the signalling OFDM symbol. It can also be seen experimentally, that with this value of the factor P, preamble detection can be achieved. A value of P=8 dB has, therefore, been adopted for the different half and quarter rate code rates with QPSK modulated data subcarriers of the signalling OFDM symbol. As can be seen an optimising choice for the factor P can be chosen from the results produced.

Determining a Suitable Guard Interval Fraction

According to example embodiments of the present technique, the same preamble symbol will delimit physical layer frames meant for both fixed and mobile reception. In the following analysis it is assumed that a broadcast transmission system, which has both types of transmission frames will be used. As such one of the principal factors affecting the reception of payload data bearing OFDM symbols transmitted for fixed reception is spectral efficiency. As explained above, this means the use of large numbers of sub-carriers for the OFDM symbols and correspondingly large FFT sizes because a smaller guard interval fraction (GIF) can be used to get a large guard interval duration (GID). A large GID can allow a broadcast system to have a greater separation between broadcast transmitters and can operate in environments with a greater delay spread. In other words the broadcast transmission system is configured with a wider spacing between transmitters forming a single frequency network (SFN).

Figure 10A:
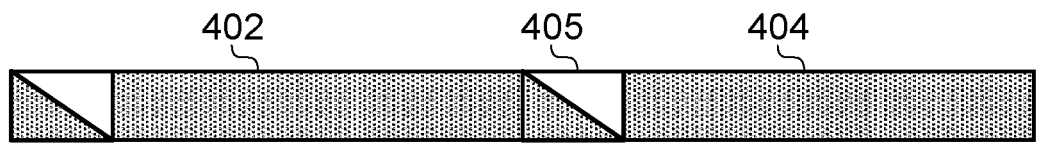
FIG. 10a is a schematic representation of OFDM symbols with a guard interval matched to an expected channel delay spread produced for a single frequency transmission network.
Figure 10B:
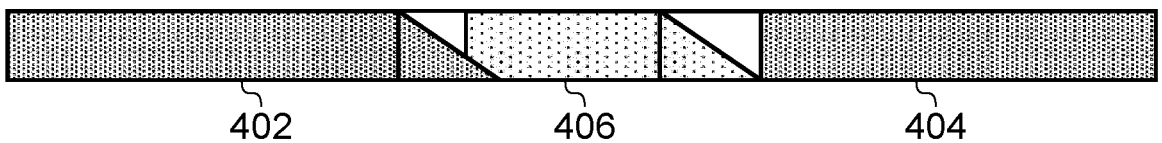
FIG. 10b is a schematic representation of OFDM symbols with different numbers of sub-carriers per OFDM symbol with a guard interval selected as a fixed fraction of the related OFDM symbol duration.
Figure 10C:
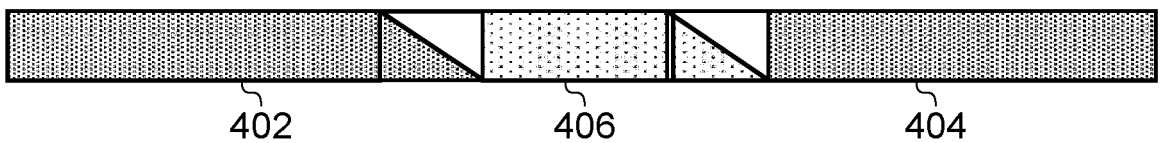
FIG. 10c is a schematic representation of OFDM symbols with a different number of sub-carriers per payload data bearing OFDM symbol and a different number of sub-carriers for a signalling OFDM symbol with guard interval selected to have a duration which is matched to both the payload and the signalling OFDM symbols.

FIG. 10 illustrates how the selection of the guard intervals can be affected when different operating modes providing different numbers of sub-carriers per OFDM symbol (different FFT sizes) are used for different frames in the same transmission. In contrast to the diagram shown in FIG. 5, the diagram shown in FIG. 10 is in the time domain. Three sets of OFDM symbols are shown in the time domain illustrative of what may happen at the point where one frame ends and another starts in a single transmission. In FIG. 10a the duration of the last OFDM symbol 402 of the ending frame is the same as that of the first OFDM symbol 404 of the starting frame. The unshaded area 405 between the two OFDM symbols 402 and 404 represents the guard interval that precedes symbol 404. In FIG. 10b an example of a preamble symbol shown as the light grey area 406 is inserted to delimit the two frames. As can be seen, this example preamble symbol 406 has a shorter duration than the data bearing symbols 402 and 404 as a consequence of having a different number of sub-carriers per OFDM symbol. Accordingly, if the GIF for the preamble symbol is the same as for the data symbols, the guard interval duration for the preamble symbol will not be as long as that of the data bearing symbols. Accordingly, if the delay spread of the channel is as long as the guard interval of the data bearing OFDM symbol 402, then the preamble symbol 406 will suffer inter-symbol interference from the last symbol 402 of the previous frame. Examples shown in FIG. 10c can provide an arrangement in which the guard interval fraction for the preamble symbol is selected to the effect that the guard interval duration of the preamble symbol 406 matches or may be longer than the guard interval duration of the last data bearing symbol 402 of the previous frame.

According to some example embodiments the largest number of sub-carriers per symbol is substantially thirty two thousand (32K). With a 32K FFT size in DVB-T2 for example, the largest GIF is 19/128. For 6 MHz channel raster, this represents a GID of about 709.33 us. When this GID is used for the frame carrying OFDM symbols targeted for fixed receivers, the preamble OFDM symbol GID should at least be of a similar value, otherwise, the preamble symbol will suffer inter-symbol-interference from the last symbol of a previous fixed reception frame.

In a 6 MHz channel raster system in which for example DVB-T2 is transmitted, an OFDM symbol having substantially four thousand sub-carriers (4K) OFDM symbol has a duration of only 2*224*8/6=597.33 us. Therefore even with a GIF=1, it is not possible to get a GID of 709.33 us with a 4K OFDM symbol. A table below lists possible operating modes that are receivable in medium to high Doppler frequencies (for the mobile environment) and some possible guard intervals.

TABLE 2

Mobile FFT modes and their possible guard intervals

| FFT Size | Tu in 6 MHz (us) | GIF | GID (us) | Ts (us) |
|---|---|---|---|---|
| 4K | 597.33 | 1 | 597.33 | 1194.667 |
|  |  | ¼ | 298.67 | 1493.338 |
|  |  | ½ | 597.33 | 1792.005 |
| 8K | 1194.67 |  |  |  |
|  |  | 19/32 | 709.33 | 1904.000 |
|  |  | ¾ | 896.00 | 2090.638 |

From the above table it can be seen that only an 8K operating mode for the preamble OFDM symbol has GIF<1 which matches or exceeds the maximum GID for a 32K maximum number of sub-carriers of the OFDM symbol. In conclusion therefore, embodiments of the present technique can provide a number of sub-carriers for the signalling or preamble OFDM symbol of 8192 sub-carriers, which corresponds to an 8K FFT size, for which the GIF will be about 19/32. This means that the total signalling OFDM symbol will have a duration of Ts≈1904 us. Furthermore an 8K operating mode will have a sub-carrier spacing, which provides a mobile receiver with a reasonable chance of detecting and recovering the signalling data from the preamble OFDM symbol in medium to high Doppler frequencies. It can be understood that in embodiments of this disclosure, the GIF of the preamble symbol has to be chosen to have the same GID that is the same or longer than the longest GID of the maximum FFT size available in the system.

In embodiments, the following table summarizes the FFT size specific options for the guard interval length.

| FFT Size | Guard Interval Fractions | Guard Interval Duration (μS) (Assuming 6 MHz Channel Bandwidth) |
|---|---|---|
| 8K | [3, 6, 12, 24, 48, 57, 96]/512 | [7, 14, 28, 56, 112, 133, 224] |
| 16K | [3, 6, 12, 24, 48, 57, 96]/512 | [14, 28, 56, 112, 224, 266, 448] |
| 32K | [3, 6, 12, 24, 48, 57]/512 | [28, 56, 112, 224, 448, 532] |

In embodiments, the same preamble is used for all frame types. The preamble consists of a regular 8 k symbol with an extended guard interval GI (fractional length 57/128). This GI is chosen to map to the longest possible guard interval for a 32 k FFT size, i.e. 57/512). ISI avoidance for all frame types is therefore guaranteed.

In some embodiments the 8 k mode is an operating mode in which the number of active or useful subcarriers lies between 4097 and 8192, the 16 k mode is an operating mode in which the number of active or useful subcarriers lies between 8192 and 16384, and the 32 k mode is an operating mode in which the number of active useful subcarriers lies between 16385 and 32768.

In some embodiments, when referring to 6 Mhz raster herein, in practice the useful bandwidth is approximately 5.71 MHz or 5.70 MHz allowing for small guard bands and/or depending on the precise number of active sub-carriers used.

The pilot pattern as inserted by the pilot insertion unit will now be explained. First, a scattered pilot pattern is described. Scattered pilots are inserted into the signal at regular intervals in both time and frequency direction. The following table summarizes the proposed pilot patterns for SISO. Dy denotes the scattered pilot-bearing carrier spacing, Dy denotes the pattern repetition rate in time direction (i.e. number of OFDM symbols). Furthermore, a capacity loss number due to the scattered pilot overhead is provided.

| Label | Dx | Dy | Dx · Dy | Capacity Loss |
|---|---|---|---|---|
| P4,4 | 4 | 4 | 16 | 6.25% |
| P8,2 | 8 | 2 | 16 | 6.25% |
| P16,2 | 16 | 2 | 32 | 3.1% |
| P32,2 | 32 | 2 | 64 | 1.6% |

Compared to DVB-T2, the number of required pilot patterns is reduced from 8 to 4. The patterns are designed to optimize the 6MHz bandwidth default case, an extension to other bandwidths is however applicable. A small value for Dy is chosen to reduce memory size and for better mobile performance. Furthermore this selection reduces latency. The options for mapping the different scattered pilot patterns to different guard interval lengths and FFT sizes are given in the following table indicating the scattered pilot pattern to be used for each allowed combination of FFT size and guard interval in SISO mode.

| FFT Size | Guard Interval Fraction | | | | | | |
|---|---|---|---|---|---|---|---|
|  | 3/512 | 6/512 | 12/512 | 24/512 | 48/512 | 57/512 | 96/512 |
| 6K |  |  |  | P4,2 |  |  |  |
|  |  |  | P8,2 | P4,4 | P4,2 | P4,2 |  |
| 16K | P32,2 | P16,2 | P16,2 |  | P4,4 | P4,4 | P4,2 |
|  |  | P32,2 | P32,2 | P8,2 | P8,2 | P6,2 | P4,4 |
| 32K |  |  |  | P16,2 |  |  |  |

Channel Estimation Considerations

As known in OFDM transmission systems such as DVB-C2, frequency domain preamble pilots may be inserted into a preamble symbol at regular intervals for use in channel estimation and equalisation of the preamble symbol. A density of such pilots Dx, which is the spacing in the frequency is dependent on the maximum delay spread that can be expected on the channel. As explained above, with a single frequency transmission network, it can be advantageous to use a larger GID. For such single frequency networks, a channel impulse response can have a duration which is equal to the GID. Thus, the delay spread of the channel for preamble equalisation may be as much as the GID. When using preamble pilots spaced by Dx subcarriers, pilot-aided channel estimation is possible for delay spreads as long as Tu/Dx. This means that Dx must be set such that:

$T_u/D_x \geq T_g$

Since for an 8K preamble in a 6 MHz channel, Tu=1194.67 us, $$D_x \leq \left\lceil \frac{T_u}{T_g} \right\rceil$$

Substituting Tu=1194.67 and Tg=709.33, $D_x \leq 2$. This means that more than one in every two sub-carriers of the signalling OFDM symbol would become a pilot sub-carrier.

This would have the effect of cutting the capacity of the signalling OFDM symbol by more than half. As such, this conclusion suggests that an alternative technique should be adopted to estimate the channel impulse response rather than using frequency domain pilots.

Frequency Offset Considerations

At first detection, the signalling or preamble OFDM symbol may have to be decoded in the presence of any tuning frequency offsets introduced by tuner 52. This means that either the signalling data should be modulated unto the preamble OFDM symbol in a manner that reduces the effects of any frequency offsets or resources are inserted into the preamble symbol to allow the frequency offset to be estimated and then removed prior to preamble decoding. In one example the transmission frame may only include one preamble OFDM symbol per frame so the first option is difficult to achieve. For the second option, additional resources can be in the form of frequency domain pilot sub-carriers, which are inserted into the OFDM so that these can be used to estimate the frequency offset and common phase error. The frequency offsets are then removed before the symbol is equalised and decoded. In a similar vein to the insertion of pilots into the data payload bearing OFDM symbols, embodiments of the present technique can be arranged to provide within the signalling (preamble) OFDM symbol pilot sub-carriers, which can allow for the estimation of frequency offsets that are larger than the preamble sub-carrier spacing. These pilots are not spaced regularly in the frequency dimension to avoid instances when multipath propagation may result in regular nulls of the pilots across the full preamble OFDM symbol. Accordingly, 180 pilot sub-carriers can be provided across the 8K symbol with the positions defined apriori. The sub-FFT bin frequency offset is estimated via the detection of the preamble OFDM symbol itself. Accordingly embodiments of the present technique can provide a preamble OFDM symbol in which the number of sub-carriers carrying pilot symbols is less than the number which would be required to estimate a channel impulse response through which the preamble OFDM symbol is transmitted, but sufficient to estimate a coarse frequency offset of the transmitted OFDM symbol.

Frequency Offset Detection at the Receiver

Figure 11A:
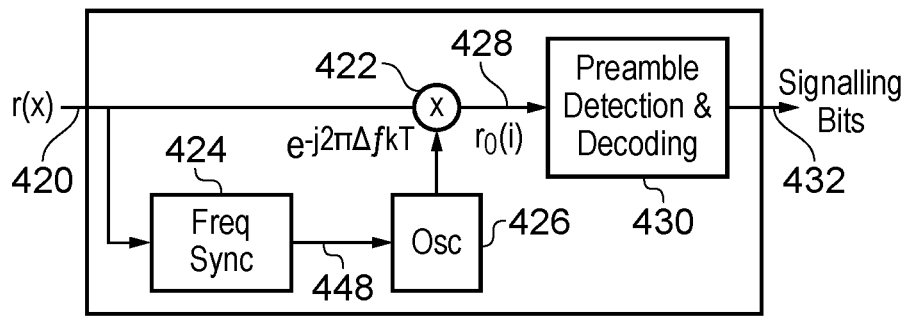
FIG. 11a is a schematic block diagram of a receiver for detecting and recovering signalling data from a signalling OFDM symbol according to the present technique.

As explained above the preamble is formed by combining an OFDM symbol carrying signalling data with a signature sequence. In order to decode the signalling data, the receiver has to first detect and capture the preamble OFDM symbol. In one example the signature sequence may be detected using a match filter which has impulse response which is matched to the conjugate of the complex samples of the known signature sequence. However any frequency offset in the received signal have an effect of modulating the output of the matched filter and preventing accurate detection of the signature sequence using a match filter. An example receiver for detecting the preamble and recovering the signalling information provided by the preamble in the presence of a frequency offset is shown in FIG. 11a. In FIG. 11a, a signal received from an antenna is converted to a baseband signal, using a conventional arrangement as shown in FIG. 4 and fed from an input 420 respectively to a complex number multiplier 422 and a frequency synchroniser 424. The frequency synchroniser 424 serves to detect the frequency offset in the received signal r(x) and feed a measure of the offset in respect of a number of subcarriers to an oscillator 426. The oscillator 426 generates a complex frequency signal which is fed to a second input of the multiplier 422 which serves to introduce a reverse of the offset into the received signal r(x). Thus the multiplier 422 multiplies the received signal r(x) with the output from the oscillator 426 thereby compensating or substantially reversing the frequency offset in the received signal so that a preamble detection and decoding unit 430 can detect the preamble OFDM symbol and recover the signalling data conveyed by the preamble which is output on output channel 432.

Figure 11B:
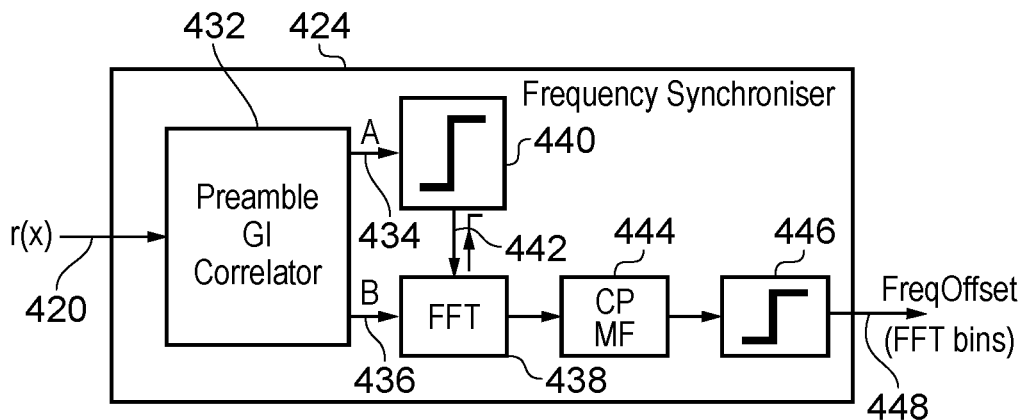
FIG. 11b is a schematic block diagram of a frequency synchronisation detector which forms part of FIG. 11a, FIG. 11c is a schematic block diagram of a preamble guard interval correlator which forms part of FIG. 11b.

FIG. 11b provides an example implementation of the frequency synchroniser 424 which forms part of the receiver shown in FIG. 11a. In FIG. 11b the received signal is fed from the input 420 to a preamble guard interval correlator 432 which generates at a first output 434 a signal providing an indication of the start of the useful part of the OFDM symbol. A second output 436 feeds the samples of the OFDM symbol to a Fourier transform processor 438, but delayed by the number of samples Nu in the useful part. The first output 434 from the preamble guard interval correlator 432 detects the location of the guard interval and serves to provide a trigger signal from a threshold detector 440 to the FFT 438 through a channel 442 which triggers the FFT 438 to convert the Nu time domain samples of the useful part of the OFDM symbol into the frequency domain. The output of the Fourier transform processor 438 is fed to a continuous pilot (CP) matched filter unit 444, which correlates the pilot signals in the received OFDM symbol with respect to replicas at the receiver which are used to set an impulse response of the CP matched filter in the frequency domain. The matched filter 444 therefore correlates the regenerated pilots with the received OFDM symbol and feeds a result of the correlation to an input to a detection threshold unit 446. The detection threshold unit 446 detects an offset in the received signal in terms of the number of FFT bins on channel 448 which effectively provides the frequency offset which is fed to the oscillator 426 for correcting the offset in the received signal.

Figure 11C:
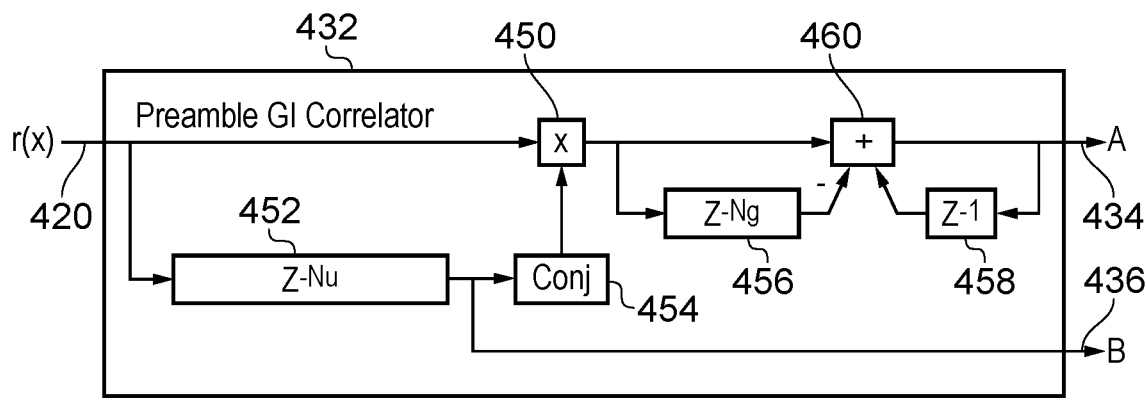
FIG. 11d is an illustrative schematic block diagram of a further example of a coarse frequency offset synchronisation detector which forms part of the receiver of FIG. 11a, and FIG. 11e is an illustrative schematic block diagram of a differential encoder which forms part of FIG. 11d.

FIG. 11c provides an example of implementation of the preamble guard interval correlator 432 and corresponds to a conventional arrangement for detecting the guard interval. Detection is performed by cross correlating the samples of the received OFDM symbol with themselves after a delay of Nu samples with the cross correlation outputs accumulated over consecutive Ng sample intervals. Thus the received signal is fed from an input 420 to a multiplier 450 and a delay unit 452 which feeds an output to a complex conjugator 454 for multiplying by the multiplier 450 with the received signal. A delay unit 456 delays the samples by the number of samples Ng in the guard interval and a single delay unit 458 delays an output of an adder 460. The adder 460 receives from the multiplier 450 the results of multiplying the received signal with a conjugate of the delayed samples corresponding to the useful samples Nu which is then fed to the adder 460. Together adder 460, delay blocks 456 and 458 implement a moving average filter of order Ng whose effect is to accumulate successive outputs of the cross-correlator over Ng samples. Thus at a point 434 there is provided an indication of the detection of the useful part of the OFDM symbol by detecting the guard interval period. The output 436 provides the delayed received signal samples which are fed to the FFT in order to trigger the Fourier transform after the guard interval has been detected by the first output 434.

Figure 11D:
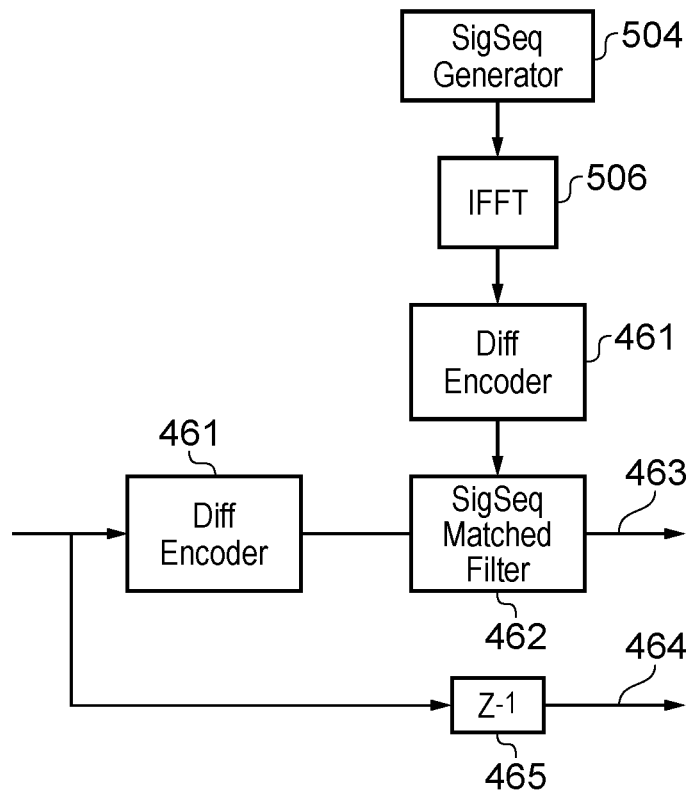
Figure 15A:
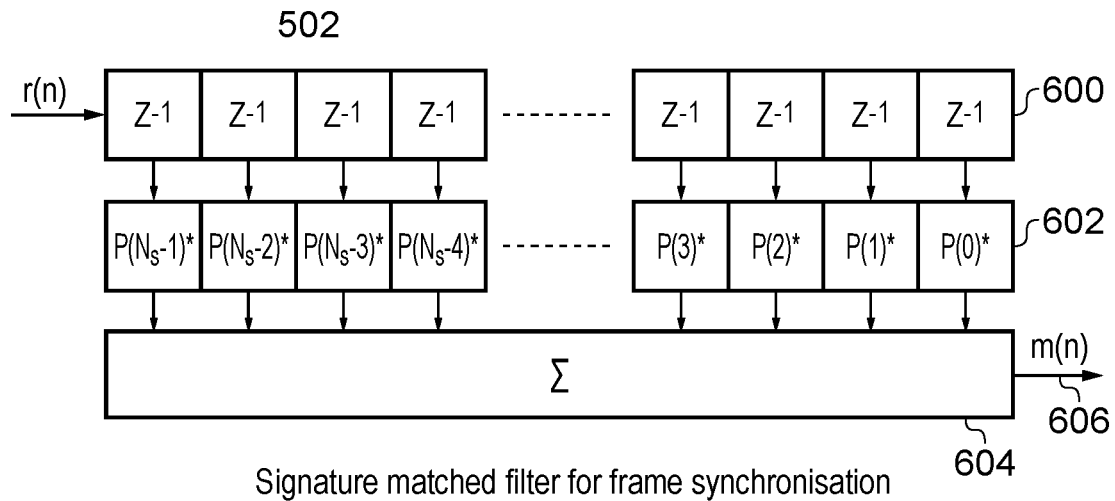
FIG. 15a is a schematic block diagram of a matched filter, which is matched to the signature sequence for which an example generator is shown in FIG. 7.

FIG. 11d provides another example of implementation of the frequency synchroniser 424 and corresponds to a first detection of the preamble symbol by use of a signature sequence matched filter 462. Firstly however, the differential encoder block 461 is used to alter the received signal so as to reduce the modulation of the matched filter output by any frequency offset present in the received signal. The differential encoder 461 is applied both to the received signal and the time domain signature sequence which is generated by inverse Fourier transform 506 of the output of the frequency domain signature sequence generator 504. The signature sequence matched filter 462 to be described later in FIG. 15a is a finite impulse response filter whose taps are set to the coefficients of the differential encoded time domain signature sequence. The circuit shown in FIG. 11d therefore forms an example of the frequency synchroniser 424 in which the signature sequence generator 504 re-generates the signature sequence, the inverse Fourier transformer 506 transforms the signature sequence into the time domain, and the differential encoder 461 compares differentially successive samples of the received signal to reduce a modulating effect of the frequency offset in the radio signal, and correspondingly compares differentially successive samples of the time domain version of the signature sequence. As already explained, the matched filter 462 has an impulse response corresponding to the differentially encoded signature sequence and receives the received signal from the differential encoder 461 and filters the differentially encoded received signal to generate at an output an estimate of the coarse frequency offset.

Figure 11E:
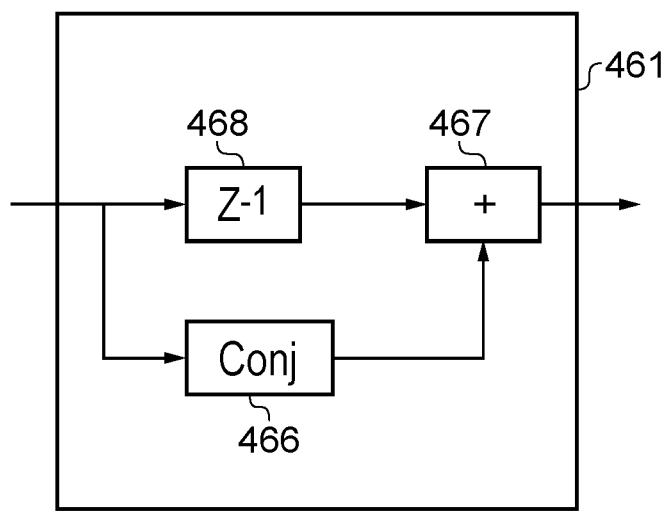

Corresponding to output channel 434 in FIG. 11b, output channel 463 in FIG. 11d produces a signal which is fed to the threshold block 440 to generate a trigger for the FFT 438; whilst output channel 436 in FIG. 11b corresponds to output channel 464 in FIG. 11d. This channel conveys the preamble OFDM symbol samples to the FFT block 438 which at the right moment is triggered by through channel 442 by the threshold block 440. FIG. 11e provides an example of the differential encoding block 461. The received samples r(n) enter a unit delay element 465 and also a conjugation block 466. The delay element 465 delays each sample for one sample period while the conjugation element 466 changes each input sample to its conjugate at its output whose effect is to convert an input $[r_i(n)+jr_q(n)]$ into an output $[r_i(n)-jr_q(n)]$. This conjugated sample is then subtracted from the output of delay element 465 by the adder 467. For an input signal $[r_i(n)+jr_q(n)]$ and output $[y_i(n)+jy_q(n)]$ n=0, 1, 2 . . . , the differential encoder 461 acts to implement the equation:

$$[y_i(n)+jy_q(n)]=[r_i(n-1)-r_i(n)]+j[r_q(n-1)+r_q(n)]$$

Accordingly before preamble detection and decoding is performed by the preamble detection and decoding unit 430 the frequency offset in the received signal is estimated and corrected by the arrangements shown in FIGS. 11a and 11b and 11c; or 11d and 11e.

Preamble Detection and Decoding at the Receiver

Figure 13:
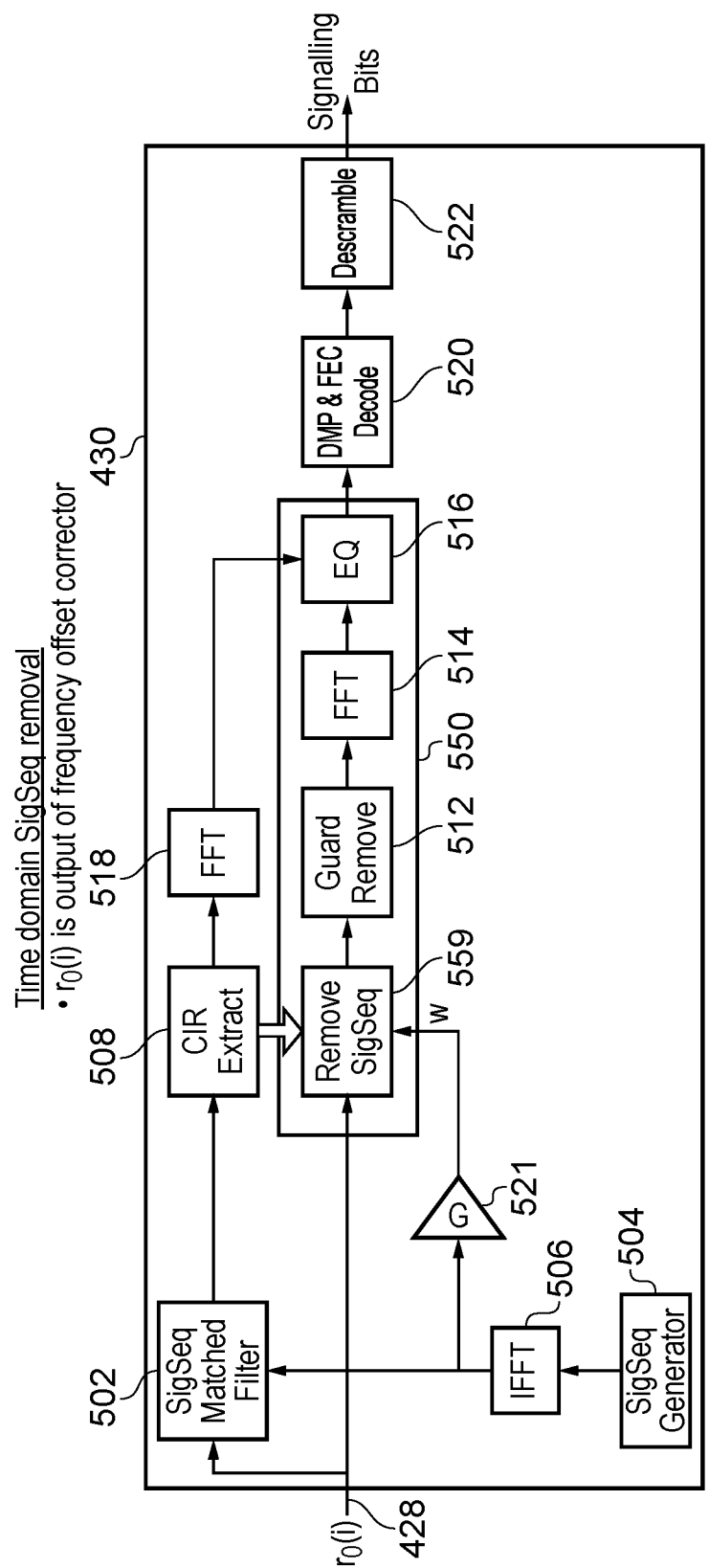
FIG. 13 is a schematic block diagram of one example of a preamble detection and decoding processor which forms part of the receiver shown in FIG. 11a, which detects and removes the signature sequence in the time domain.
Figure 14:
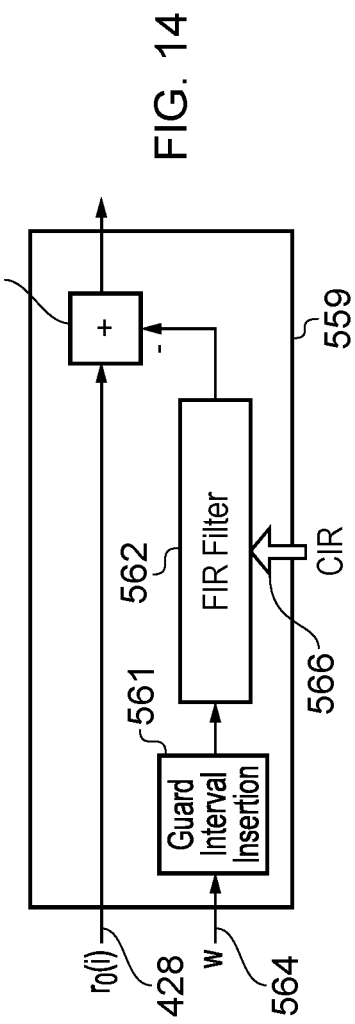
FIG. 14 is a schematic block diagram of an example of a signature sequence remover which forms part of the preamble detection and decoding processor shown in FIG. 13.

As explained above for the example of the receiver shown in FIG. 11a, a preamble detector and decoder 430 is configured to detect the preamble symbol and to recover the signalling data from the preamble symbol. To this end, the preamble detector and decoder 430 detects the preamble by detecting the signature sequence and then removes the signature sequence before recovering the signalling data from the preamble. Example embodiments of the preamble detector and decoder 430 are illustrated in FIGS. 12, 13 and 14.

Embodiments of the present technique can provide a receiver which detects the signature sequence and removes the signature sequence in the frequency domain or in the time domain. FIG. 12 provides a first example in which the signature sequence is removed in the frequency domain. Referring to the example receiver shown in FIG. 11a, the received base band signal is fed from a receive channel 428 to a matched filter 502 and a demodulator 550. The match filter 502 receives the signature sequence in the time domain after a signature sequence generator 504, which is the same as the signature sequence generator 212 at the transmitter, re-generates a copy of the signature sequence. The matched filter 502 is configured to have an impulse response which is matched to the time domain signature sequence. As such, it correlates the time domain signature sequence with the received signal fed from the receive channel 428 and the correlation output result can be used to detect the presence of the preamble OFDM symbol when an output of the correlation process exceeds a predetermined threshold. Furthermore, as a result of the presence of the signature sequence in the preamble OFDM symbol, an impulse response of the channel through which the received signal has passed can also be estimated from the correlation output of the matched filter by a channel impulse response estimator 508. The receiver can therefore include an arrangement for estimating the channel impulse response using the signature sequence without recourse to the traditional scattered pilots.

Having detected the presence of the signature sequence and estimated the channel impulse response, the effect of the channel impulse response can be removed from the received signal within the demodulator 550. Accordingly a Fast Fourier Transformer 518 transforms the channel impulse response estimate into the frequency domain channel transfer function and feeds the channel transfer function to an equaliser 516 within the demodulator 550.

Figure 12:
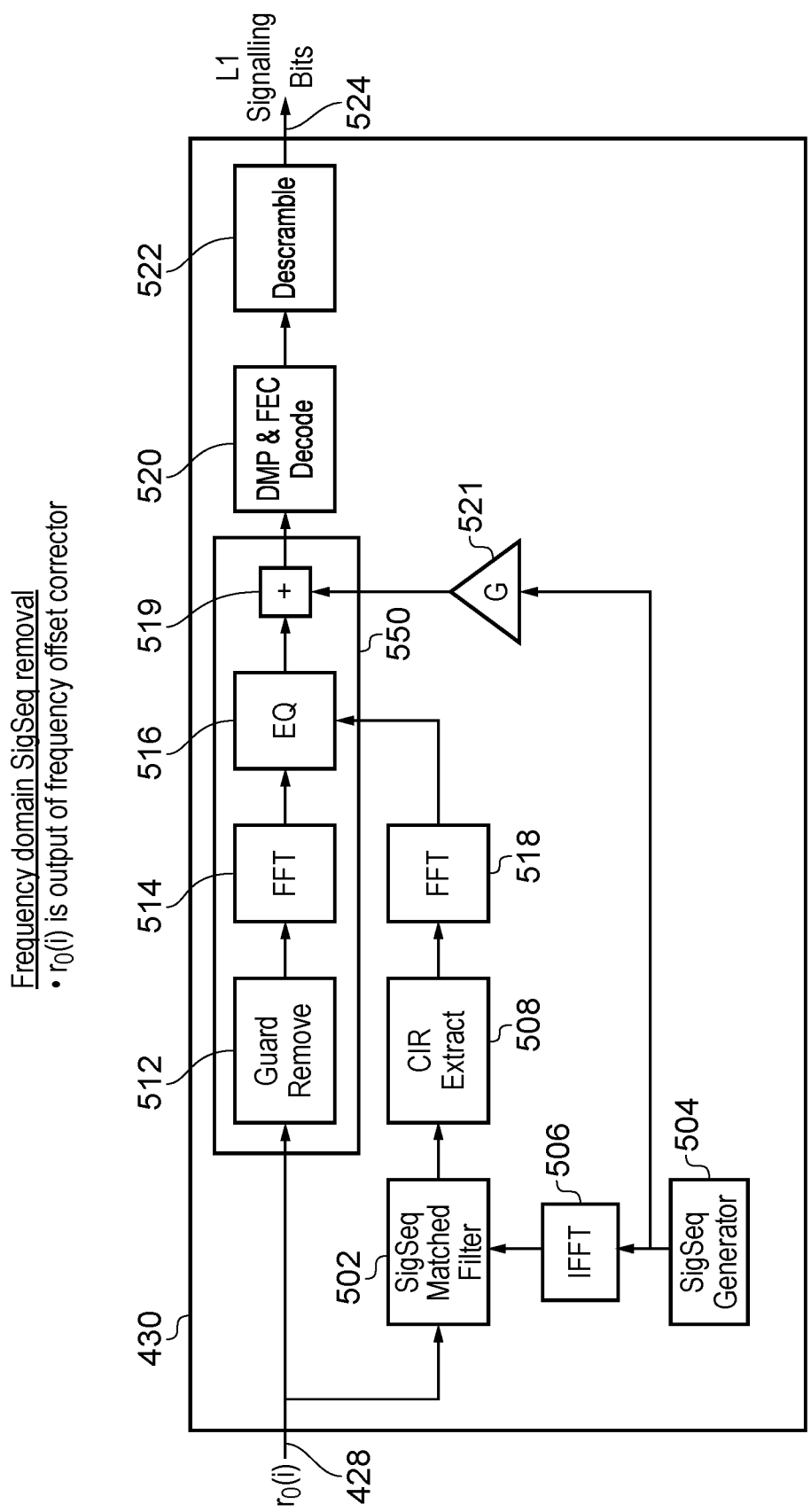
FIG. 12 is a schematic block diagram of one example of a preamble detection and decoding processor which forms part of the receiver shown in FIG. 11a, which detects and removes the signature sequence in the frequency domain.

In the receiver shown in FIG. 12 the demodulator 550 is arranged to recover the signalling data in a base band form encoded with an error correction code. The demodulator 550 therefore recovers the signalling data from the signalling (preamble) OFDM symbol, which is then decoded using a forward error correction decoder 520 before being descrambled by a descrambling unit 522 which corresponds to the scrambling unit 200 shown in FIG. 6 but performs a reverse of the scrambling.

The demodulator 550 includes a guard interval remover 512, which removes the guard interval from the signalling OFDM symbols, and an FFT unit 514, which converts the time domain samples into the frequency domain. The equaliser 516 removes the effects of the channel impulse response, which has been converted into the frequency domain to form a channel transfer function by the FFT unit 518 as already explained above. In the frequency domain the equaliser 516 divides each signalling data carrying OFDM sub-carrier by its corresponding channel transfer coefficient to remove, as far as possible, the effect of the transmission channel from the modulation symbols.

A signature sequence remover is formed by an adder unit 519 which receives the signature sequence in the frequency domain generated by the signature sequence generator 504 after this has been scaled by the scaling factor G, as explained above by a scaling unit 521. Thus the signature sequence remover 519 receives at a first input the equalised preamble OFDM symbol and on a second input a scaled signature sequence in the frequency domain and subtracts one from the other to form at the output estimates of the modulation symbols which were carried by the data bearing subcarriers of the preamble OFDM symbol.

The modulation symbols representing the error correction encoded preamble signalling data are then demodulated and error correction decoded by the demodulator and FEC decoder 520 to form at an output the scrambled bits of the L1 signalling data which are then descrambled by the descrambling unit 522 to form as an output 524 the L1 signalling data bits.

A further example of the preamble detector and decoder 430 which operates in the time domain to remove the signature sequence is showing in FIGS. 13 and 14. FIG. 13 provides an example of the preamble detector and decoder 430 which corresponds to the example shown in FIG. 12 and so only differences with respect to the operation of the example shown in FIG. 13 will be explained. In FIG. 13 as with the example in FIG. 12 the baseband received signal is fed to a signature sequence matched filter 502 and to a demodulator 550. As with the example shown in FIG. 12, the signature sequence matched filter cross-correlates the received signal with an impulse response which is matched to the time domain signature sequence. The signature sequence is received in the time domain form by regenerating the signature sequence in the frequency domain using the signature sequence generator 504 and transforming the signature sequence into the time domain using an inverse Fourier transform processor 506. As with the example shown in FIG. 12 a channel impulse response estimator 508 detects the channel impulse response from the output of the signature sequence matched filter 502 and forms this into the frequency domain channel transfer function using an FFT unit 518 to feed the frequency domain channel estimate to an equaliser 516 within the demodulator 550.

So far the operation of the example shown in FIG. 13 corresponds to that shown in FIG. 12. As shown in FIG. 13 the demodulator 550 includes the signature sequence remover 559 at before the guard remover 512. The time domain signature sequence which is fed from the inverse Fourier transform unit 560 is scaled by the scaling unit 521 by the predetermined factor G. The scaled time domain signature sequence is then fed to the signature sequence remover 559 which removes the signature sequence in the time domain from the received baseband signal. Thereafter the guard remover 512, the FFT unit 514 and the equaliser 516 operate in a corresponding way to the elements shown in FIG. 12.

Figure 15B:
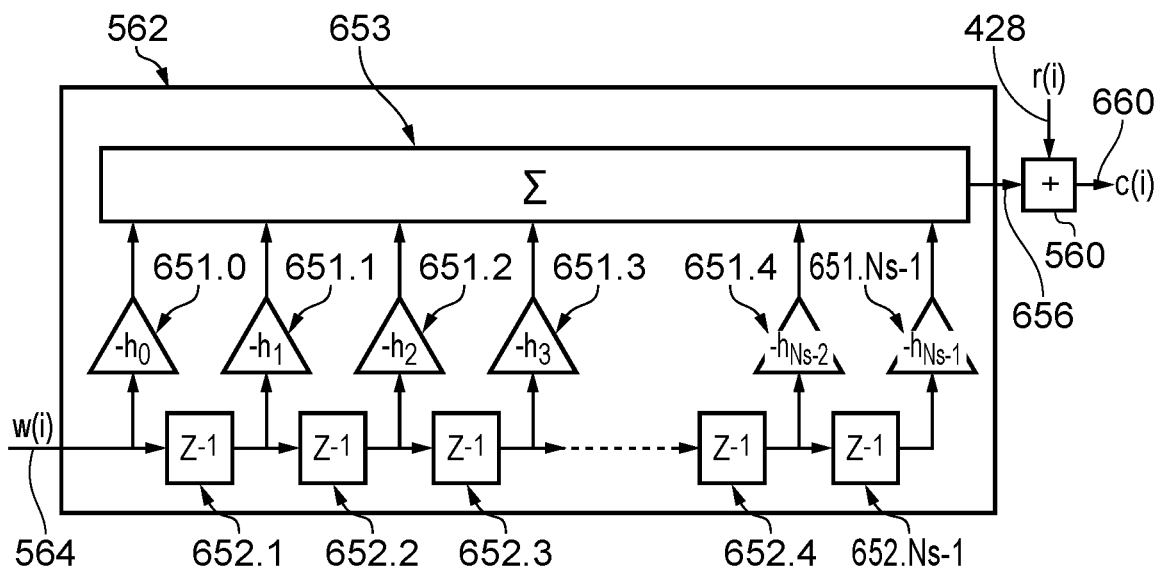
FIG. 15b is a schematic block diagram of a signature sequence remover forming part of the receiver shown in FIG. 14.

The signature sequence remover 559 shown in FIG. 13 is shown in more detail in FIG. 14. In FIG. 14 the signature sequence remover 559 comprises a guard interval inserter 561, a combiner unit 560 and an FIR filter 562. The time domain baseband received signal is received on the input channel 428 at one input of the combiner unit 560. A second input 564 receives the scaled time domain version of the signature sequence, which is fed to the guard interval inserter 561 which prepends a cyclic prefix to the signature sequence in much the same way as the guard interval inserter 561 42 at the transmitter. The output of the guard interval inserter feeds the FIR filter 562 which receives on a second input 566 the estimate of the channel impulse response generated by the channel impulse response extraction block 508. The FIR filter 562 therefore convolves the channel impulse response estimate with the signature sequence in the time domain which is then subtracted by the combiner 560 from the received baseband signal to remove the effect of the signature sequence from the received signal. FIG. 15*b* shows a more detailed example implementation of this signature sequence removal and how the FIR filter 562 is configured.

As will be appreciated the operation of the demodulator and FEC decoder 520 and the scrambler 522 perform the same functions as explain with reference to FIG. 12.

Matched Filter

As indicated above the matched filter 502 generates an output signal which represents a correlation of the received signal with the signature sequence. A block diagram showing an example of the signature sequence matched filter 502 is shown in FIG. 15*a*.

FIG. 15*a* shows a sequence of Ns delay elements 600 connected to scaling units 602 which scale each of the samples of the data stored in the delay storing unit 600 by a corresponding component of the signature sequence P(n) but conjugated. The output from each of the scaling units 602 is then fed to an adding unit 604 which forms an output signal representing a correlation of the received signal samples r(n) with the signature sequence at an output 606. The matched filter implements the equation:

$$g(i)=\Sigma_{n=0}^{Ns-1}P^*(n)r(n+i) \text{ for } i=-Ns+1,-Ns+2\ldots,0,1,2,\ldots Ns-1$$

When the filter taps P(i) are of form (±1±j1), the multiplier at each tap could simply be done by add and subtract circuits for each of the in-phase and quadrature components. When the signature sequence is a CAZAC sequence, the quadrature components of P(i) are not bipolar. The scaling units 602 can use the sign of each quadrature component instead so as to have the form (±1±j1).

Figure 16A:
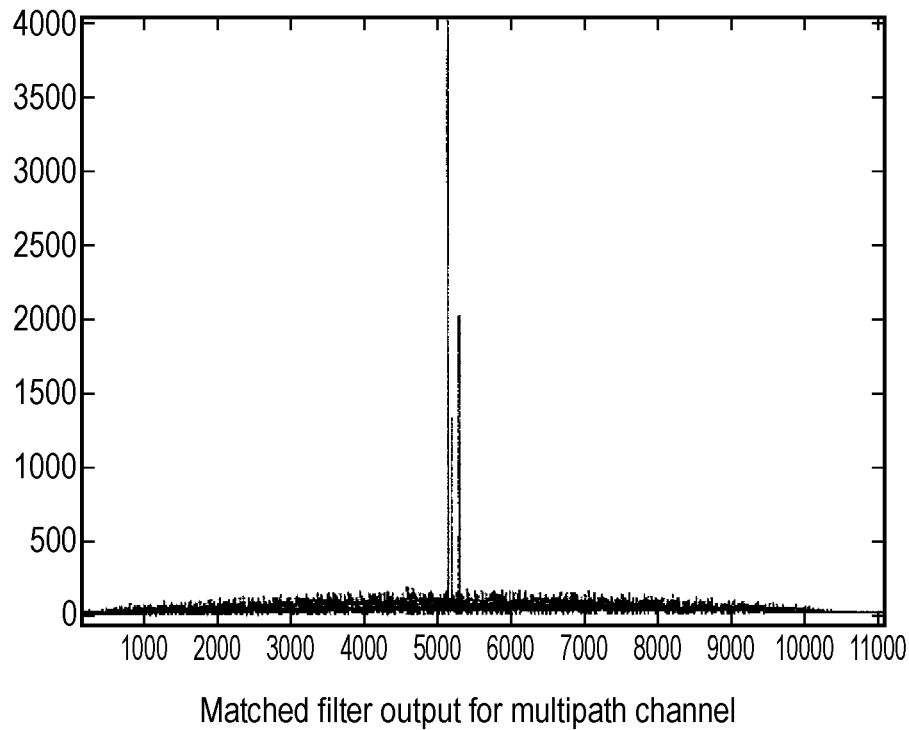
FIG. 16a is a graphical representation of a signal formed at the output of the matched filter.
Figure 16B:
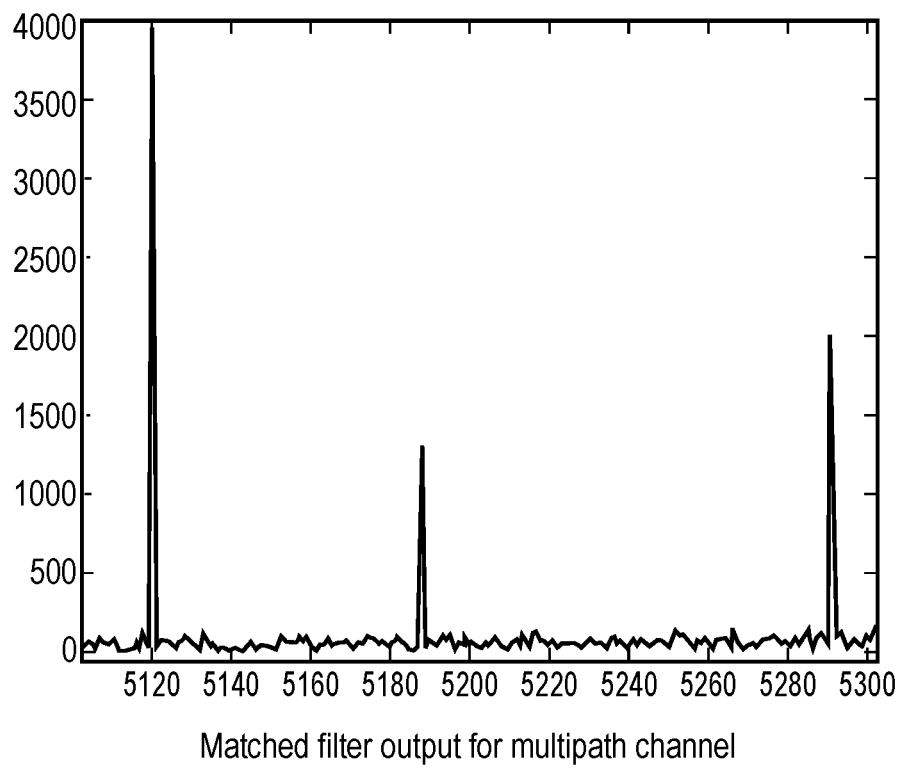
FIG. 16b is an expanded view of the graphical representation shown in FIG. 16b illustrating components of a channel impulse response.

FIG. 16*a* and FIG. 16*b* provide examples of a correlation output of the match filter for a multipath environment. In this case the channel is composed of three paths and the preamble is a 4K symbol with GIF of ¼ For illustrative purposes only. As can be seen there is a clear correlation peak when the signature sequence of the received signal coincides with the signature sequence at the receiver. The example shown in FIG. 16*b* shows the output of the match filter but with a more expanded x-axis showing an increase in resolution which is expanded from the correlation peak shown in FIG. 16*a*. For this channel, there are three paths as tabulated in the Table below:

TABLE 3

Multipath profile of example channel

| Path | Delay(us) [samples] | Power(dB) |
|---|---|---|
| 1 | 0 [0] | 0 |
| 2 | 10 [68] | −10 |
| 3 | 25 [171] | −6 |

Channel Impulse Response Extractor

As can be seen from FIG. 16*b*, both the amplitudes of the main impulses and their relative delays coincide with the characteristics of the multipath channel profile through which this particular signal propagated. To detect the actual channel paths, a threshold of energy detection is set to an appropriate multiple of the root mean square (RMS) level of the matched filter output within a window ±Ns of the highest amplitude output sample. The exact multiple of the RMS is chosen experimentally depending on the lowest signal to noise ratio under which the system is to work. Any sample of the matched filter output above this threshold is taken as a channel path, and all other samples are then set to zero in the channel impulse estimator 508. Finally, the channel impulse response (CIR) is normalised by dividing all its samples with the highest amplitude sample. In this way, the relative amplitudes and delays of each of the impulses in the channel through which the received signal has passed can be estimated.

Signature Sequence Remover

Having formed an estimate of the channel impulse response, a component of the received signal corresponding to that contributed by the signature sequence in the received signal can be generated by passing the received signal r(i) through the signature sequence remover 559, which is configured with filter taps $h_n$ to reflect the delay and amplitude profile of the channel impulse response. This can be accomplished by suitable scaling, shifting and adding of the signature sequence of length Ns=Nu+Ng of the preamble symbol. An example of the filter is shown in FIG. 15b.

As shown in FIG. 15b, the signature sequence remover 559 includes a finite impulse response (FIR) filter 562 made up of a delay line comprised of Ns−1 delay elements 652.1, 652.2, to 652.Ns−1. The output of these delay elements are connected to corresponding gain terms 651.1, 651.2, to 651.Ns−1 each of which gain stages feed their output to the adder 653. The input 654 of the filter is connected both to the input of delay element 652.1 and to the input of gain term 651.0. The output 656 of the FIR filter 650 is connected to the input of an adder 560 whose other input 657 receives the received preamble signal samples r(i). During operation, the gain stages of the FIR filter are set to the negative values of the samples of the channel impulse response derived by the channel impulse response estimator 506. The FIR 650 generates at an output 656 a signal representing the convolution of the signature sequence by the channel impulse response estimate, which effectively provides an estimate of the effect of the channel on the signature sequence imposed upon the signalling OFDM symbol. An adder 560 then subtracts the output signal of the FIR 656 from the received signal from an input 657 to remove the effect of the signature sequence from the received signal to form an output 660. Therefore a result (of the signature sequence transiting the channel described by the channel impulse response) is subtracted from the received signal by the signature sequence remover 510 with a delay matched to the point from which the first significant impulse (of the output of the matched filter) occurred. This process can be iterated in that the matched filter 502 can be re-run with the results of the subtraction, the channel impulse response re-estimated by the channel impulse response estimator 508 and the its effect on the signature sequence being extracted again by the signature sequence remover 559. As a result, a more accurate estimate of the effect of the signature sequence on the received signal can be estimated and subtracted from the received signal Channel impulse responses from all iterations can then be summed and normalised to provide an improved estimate of the channel impulse response from which the channel transfer function (CTF) is derived for preamble symbol equalisation.

Frequency Offset Estimation

Figure 17:
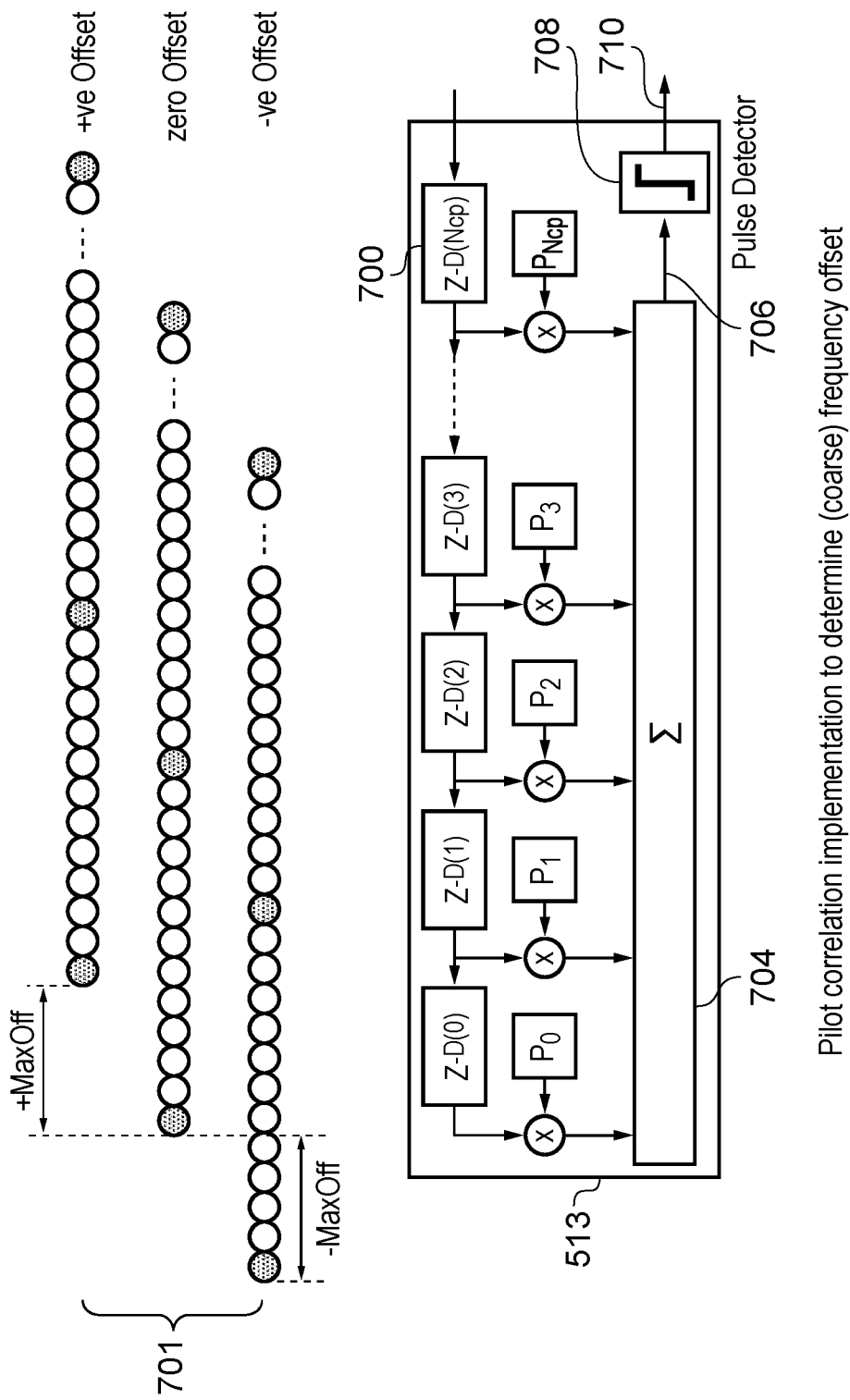

FIG. 17 provides a more detailed schematic block diagram of the preamble pilot matched filter 444 used for detecting a coarse frequency offset in the received signalling OFDM symbol, which may form part of the frequency synchroniser 424 of FIG. 11a. As explained above, the number of pilots introduced into the signalling OFDM symbol is less than the number which would be required in order to estimate the channel. The number of pilot symbols is therefore set to estimate a coarse frequency offset. The block diagram shown in FIG. 17 provides an example representation of the coarse frequency remover 513 and is shown with three versions of the received preamble signal 701.

As shown in FIG. 17 a sequence of delay elements 700 are used to feed in discrete samples of the signal which are then multiplied by multipliers 702 with the known pilot signal values P(n) and summed by a summing unit 704 to form a correlation output 706. A pulse detector or peak detector 708 is the same one shown as 446 in FIG. 11b which then generates an output signal on channel 710 showing a peak when there is a coincidence between a relative offset of the received signal with the company of the pilot signals at the receiver. Shaded circles of each received signal 701 show sub-carrier cells that represent preamble pilots whilst the un-shaded cells show non-pilot sub-carrier cells. All sub-carrier cells are shifted into the transversal filter from right to left. The parameter MaxOff is a design parameter that represents the maximum value of the frequency offset in units of sub-carrier spacing Q that the designer may expect. The output of the pulse detector is only valid between shifts (0.5(Na+Nu)−MaxOff) and (0.5(Na+Nu)+MaxOff) where Na is the number of sub-carriers (out of a total of Nu) used in the preamble OFDM symbol. If the shifts are numbered from −MaxOff to +MaxOff then the pulse detector output will go high for the shift that corresponds to the observed frequency offset.

Once Q is detected, this coarse frequency is removed by shifting the subcarriers by −Ω i.e. in the opposite direction to the frequency offset. This can also be removed prior to FFT in common with the fine frequency offset which is estimated from the argument of the peak preamble detection matched filter or guard interval correlation 432 peak sample by modulation with a suitably phased sinusoid generated by the oscillator 426 in FIG. 11a. The two frequency offsets can be used to start off the carrier correction loop for the rest of the OFDM symbols in the frame.

Figure 18:
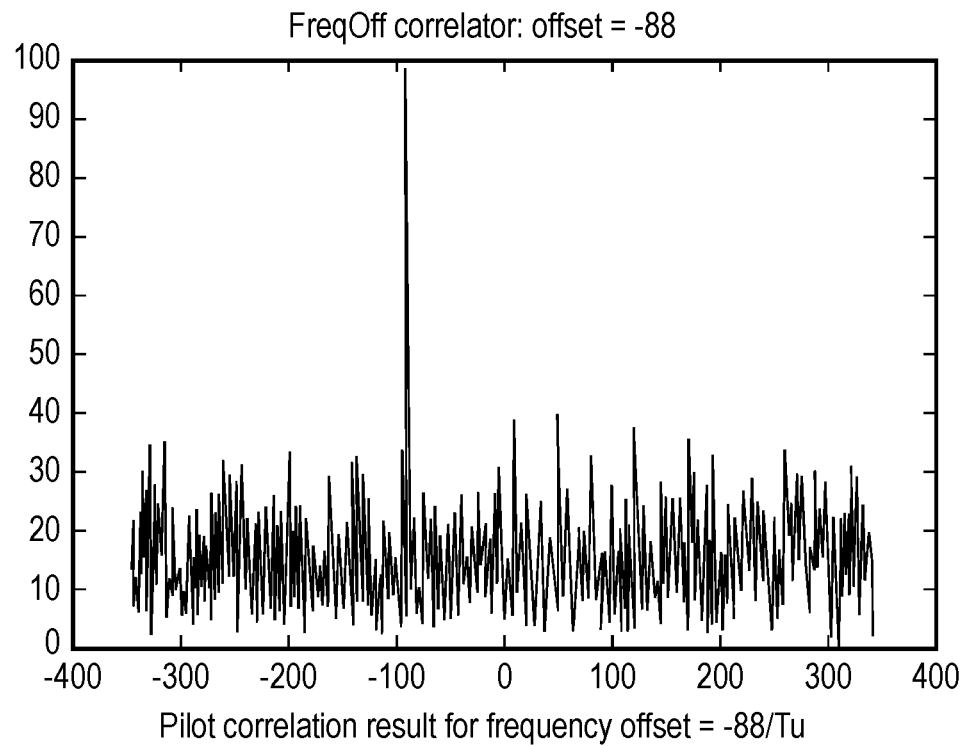
FIG. 18 is a graphical plot of the correlation output of the circuit shown in FIG. 17 for a frequency offset of −88/Tu.

FIG. 18 shows a pilot correlation result of a frequency offset in an example plot of the input of the pulse detector for a frequency offset of Ω=−88 in a case where MaxOff is set to 350. The pulse detector might use a threshold to clip this input as a detector of the presence or absence of a substantial pulse.

Preamble Symbol Equalisation

Figure 19:
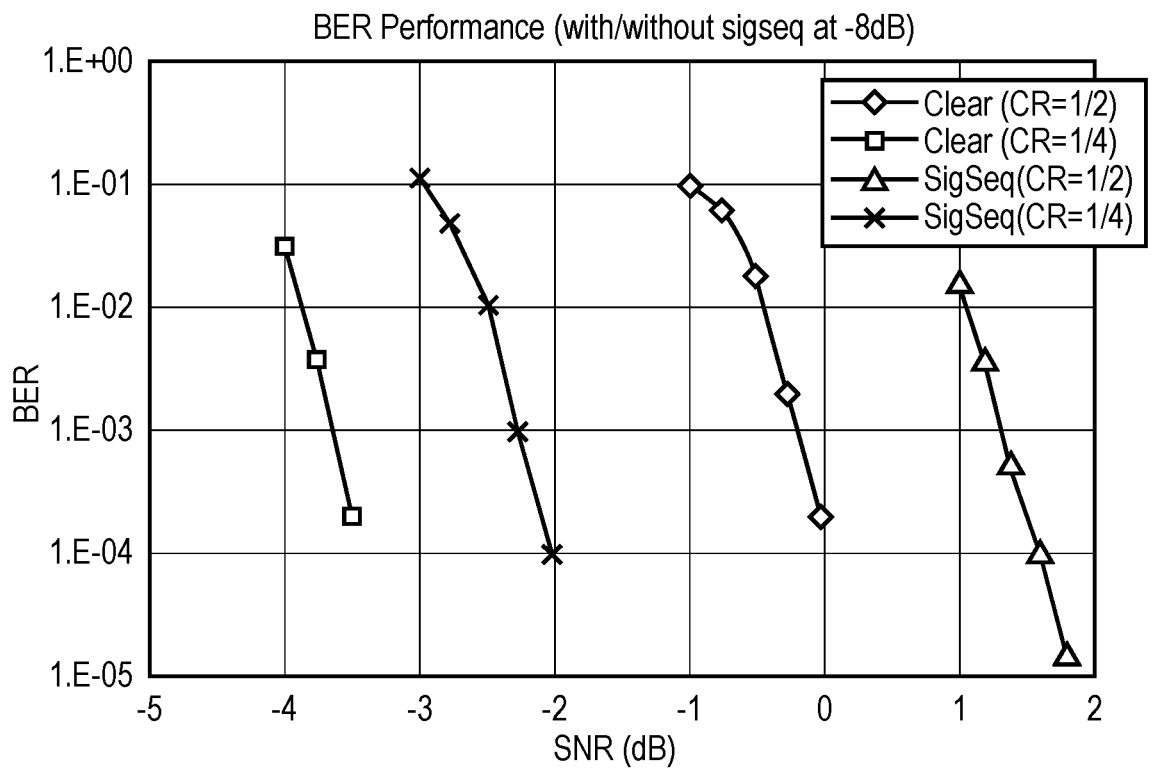
FIG. 19 provides a graphical plot of bit error rate with respect to signal to noise ratio for different code rates with and without a signature sequence added to the signalling OFDM symbol for rate one half and rate one quarter codes.

After signature sequence removal from the received samples and the coarse frequency offset has been adjusted, OFDM equalisation can begin with the FFT of the received sequence. The FFT window starts from a trigger position in the FFT unit 514 corresponding to the relative delay of the first impulse in the channel impulse response estimate. If the channel impulse response estimate duration is longer than the preamble GID, then the trigger position is altered to ensure that it starts at the beginning of a Ng (Ng is the number of time domain samples in the guard interval of the preamble symbol) long window under which the maximum of the energy of the channel impulse response estimate falls. The Nu point FFT produces the preamble OFDM symbol in the frequency domain with the effect of the channel superposed. Before equalisation and decoding, any frequency offsets have to be calculated and removed by the frequency offset remover as explained above with reference to FIGS. 11a, 11b, 11c. This estimation uses correlation with the known preamble pilots to determine how far to the right or left the full symbol is shifted in frequency. Equalisation of the preamble OFDM symbol requires a channel transfer function (CTF). This is derived by executing a Nu point FFT on the channel impulse response estimate by the FFT unit 518. This provides a channel transfer function for all sub-carriers in the preamble OFDM symbol allowing subcarrier by subcarrier one-tap equalisation to take place. Finally, the equalised data subcarriers are extracted (pilot subcarriers discarded) and de-mapped, forward error correction (FEC) decoded to provide the signalling Selected Results FIG. 19 provides a graphical plot of bit error rate with respect to signal to noise ratio for different code rates with and without the addition of the signature sequence to the signalling OFDM symbol. Thus, two code rates are shown, rate one half and rate one quarter, each code rate including the example of the presence of the signature sequence and without the signature sequence. As can be seen, the results for rate one quarter show that the signalling OFDM symbol can be detected even at signal to noise ratios of less than −2 dBs.

Figure 20A:
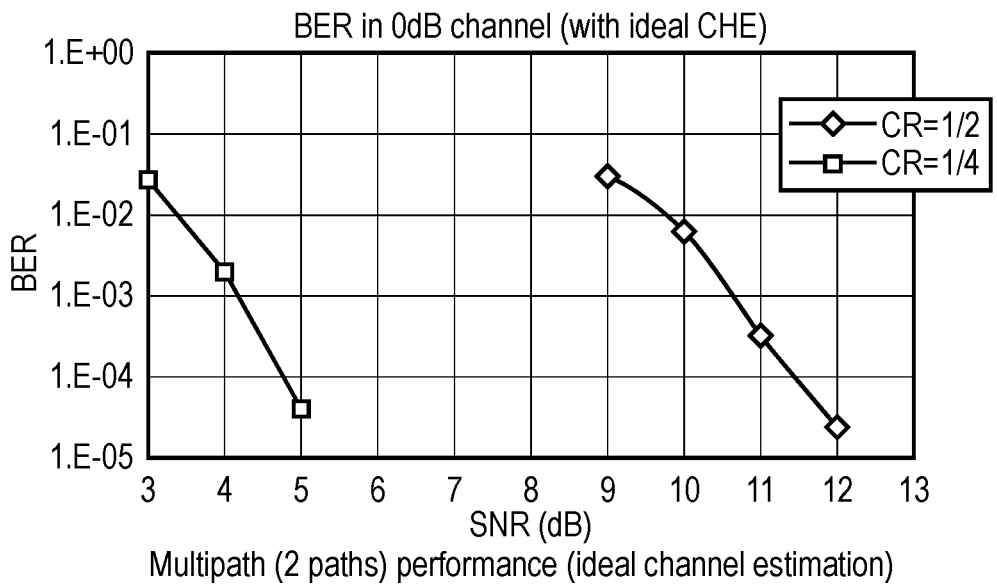
FIGS. 20a and 20b provide graphical plots of bit error rate against signal to noise ratio for a 0 dB echo channel with two paths as illustrated in FIG. 20c respectively with ideal and actual channel estimation.
Figure 20B:
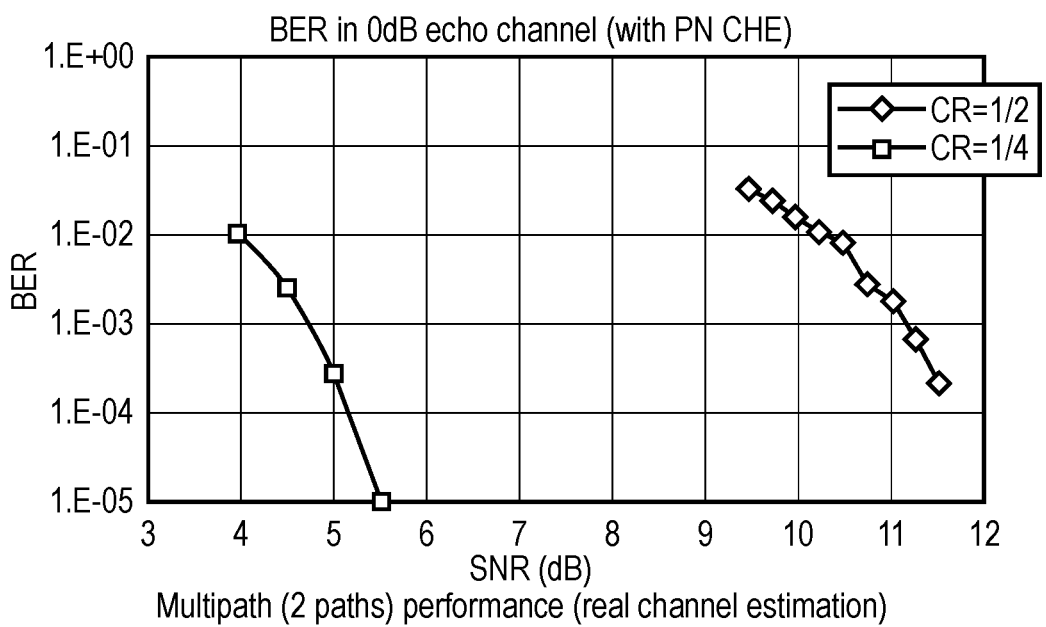
Figure 20C:
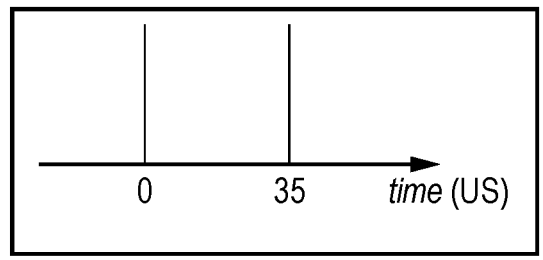

Two further sets of results shown in FIGS. 20a and 20b provide a graphical plot of bit error rate against signal to noise ratio in which for the results shown in FIG. 20a there is a 0 dB echo channel with an ideal channel estimation and in FIG. 20b a multipath environment with two paths as illustrated in FIG. 20c. Thus for FIG. 20b in contrast to the result shown in FIG. 20a there is a relative degradation in performance resulting from real channel estimation. However, as can be seen, the results are comparable.

Various further aspects and features of the present disclosure are defined in the following numbered clauses:

1. A transmitter for transmitting payload data using Orthogonal Frequency Division Multiplexed (OFDM) symbols, the transmitter comprising
a frame builder configured to receive the payload data to be transmitted and to receive signalling data for use in detecting and recovering the payload data at a receiver, and to form the payload data with the signalling data into frames for transmission,
a modulator configured to modulate a first OFDM symbol with the signalling data forming a part of each of the frames and to modulate one or more second OFDM symbols with the payload data to form one or more of the frames, and
a transmission unit for transmitting the first and second OFDM symbols, wherein the first OFDM symbol is a first type having a number of sub-carriers which is less than or equal to the number of sub-carriers of the one or more second OFDM symbols of a second type and a guard interval for the first OFDM symbol is selected in dependence upon the longest possible guard interval of the second OFDM symbol.

2. A transmitter according to clause 1, wherein the number of sub-carriers of the first OFDM symbol is selected in dependence upon the duration of the selected guard interval.

3. A transmitter according to clause 1 or 2, wherein the number of sub-carriers of the first OFDM symbol is selected to increase a likelihood of a receiver being able to detect and recover the signalling data from the first OFDM symbol and the number of sub-carriers of the second OFDM symbol is selected to maximise spectral efficiency.

4. A transmitter according to any of clauses 1, 2 or 3, wherein the number of sub-carriers in the second OFDM symbol is substantially thirty two thousand, sixteen thousand or eight thousand and the number of sub-carriers of the first OFDM symbol is substantially eight thousand.

5. A transmitter according to clause 4, wherein the guard interval is 19/32 or 19/64 of the duration of the first OFDM symbol.

6. A transmitter as claimed in any preceding Claim, wherein the transmitter includes a pilot signal inserter configured to insert pilot symbols on selected sub-carriers of the first OFDM symbol, the number of pilot symbol carrying sub-carriers being less than a number which would be required to estimate a channel impulse response through which the first OFDM symbol is transmitted, and sufficient to estimate a coarse frequency offset of the transmitted OFDM symbol.

7. A transmitter according to any of clauses 1 to 6, wherein the signalling data is encoded with a first error correction code and the payload data is encoded with at least one other error correction code, an encoding rate of the first error correction code being lower than an encoding rate of the at least one other error correction code.

8. A transmitter according to clause 7, wherein the signalling data is encoded with an error correction code, an encoding rate of the error correction code being lower than rate one quarter.

9. A method of transmitting payload data using Orthogonal Frequency Division Multiplexed (OFDM) symbols, the method comprising
receiving the payload data to be transmitted,
receiving signalling data for use in detecting and recovering the payload data to be transmitted at a receiver,
forming the payload data with the signalling data into frames for transmission,
modulating a first OFDM symbol with the signalling data forming a part of each of the frames and modulating one or more second OFDM symbols with the payload data to form one or more of the frames, and
transmitting the first and second OFDM symbols, wherein the first OFDM symbol is of a first type having a number of sub-carriers which is less than or equal to the number of sub-carriers of the one or more second OFDM symbols of a second type, and the transmitting includes
selecting a guard interval for the first OFDM symbol depending upon the maximum allowable duration of the guard interval useable for the one or more second OFDM symbols.

10. A method according to clause 9, wherein the selecting the guard interval for the first OFDM symbol includes selecting the number of sub-carriers of the first OFDM symbol in dependence upon the size of the selected guard interval.

11. A method according to clause 9 or 10, wherein the selecting the guard interval for the first OFDM symbol includes selecting the number of sub-carriers of the first OFDM symbol to increase a likelihood of a receiver being able to detect and recover the signalling data from the first OFDM symbol and the method comprises selecting the number of sub-carriers of the second OFDM symbol to maximise spectral efficiency.

12. A method according to clause 11, wherein the selecting the number of sub-carriers of the second OFDM symbol includes selecting the number of sub-carriers in the second OFDM symbol to be substantially thirty two thousand, sixteen thousand or eight thousand and the selecting the number of sub-carriers of the first OFDM symbol comprises selecting the number of sub-carriers of the first OFDM symbol to be substantially eight thousand.

13. A method according to clause 12, wherein the selecting the guard interval comprises selecting the guard interval to be 19/32 or 19/64 of the duration of the first OFDM symbol.

14. A method according to any of clauses 9 to 13, comprising
inserting pilot symbols on selected sub-carriers of the first OFDM symbol, the number of pilot symbol carrying sub-carriers being less than a number which would be required to estimate a channel impulse response through which the first OFDM symbol is transmitted, and sufficient to estimate a coarse frequency offset of the transmitted OFDM symbol.

15. A method according to any of clauses 9 to 14, comprising
encoding the signalling data with a first error correction code and encoding the payload data with at least one other error correction code, an encoding rate of the first error correction code being lower than an encoding rate of the at least one other error correction code.

16. A method according to clause 15, comprising encoding the signalling data with an error correction code, an encoding rate of the error correction code being lower than rate one quarter.

17. A receiver for detecting and recovering payload data from a received signal, the receiver comprising a detector for detecting the received signal, the received signal comprising the payload data and signalling data for use in detecting and recovering the payload data, the signalling data and the payload data forming frames in the received signal, the signalling data in each frame being carried by a first Orthogonal Frequency Division Multiplexed, OFDM, symbol, and the payload data being carried by one or more second OFDM symbols, and the first OFDM symbol has a number of sub-carriers which is less than or equal to the number of sub-carriers of the second OFDM symbol and a guard interval for the first OFDM symbol is selected in dependence upon the maximum allowable duration of the guard interval useable for the second OFDM symbol, a demodulator configured to detect the first OFDM symbol and the second OFDM symbol and to recover the signalling data from the first OFDM symbol in the presence of the guard interval using a forward Fourier transform with respect to the number of sub-carriers of the first OFDM symbol and using the signalling data to recover the payload data from the second OFDM symbol.

18. A receiver according to clause 17, wherein the number of sub-carriers of the first OFDM symbol is selected in dependence upon the size of the selected guard interval.

19. A receiver according to clause 17 or 18, wherein the number of sub-carriers of the first OFDM symbol is selected to increase a likelihood of a receiver being able to detect and recover the payload data from the first OFDM symbol and the number of sub-carriers of the second OFDM symbol is selected to maximise spectral efficiency.

20. A receiver according to any of clauses 17, 18, 19, wherein the number of sub-carriers in the second OFDM symbol is substantially thirty two thousand, sixteen thousand or eight thousand and the number of sub-carriers of the first OFDM symbol is substantially eight thousand.

21. A receiver according to clause 20, wherein the guard interval is 19/32 or 19/64 of the duration of the first OFDM symbol.

22. A receiver according to any of clauses 17 to 21, wherein the received signal includes pilot symbols inserted on selected sub-carriers of the first OFDM symbol, the number of pilot symbol carrying sub-carriers being less than a number which would be required to estimate a channel impulse response through which the first OFDM symbol has been transmitted, wherein the receiver includes a coarse frequency offset estimator configured to estimate a coarse frequency offset of the received first OFDM symbol, and to compensate for the coarse frequency offset in the received signal.

23. A receiver according to any of clauses 17 to 22, wherein the signalling data has been encoded with a first error correction code and the payload data is encoded with at least one other error correction code, an encoding rate of the first error correction code being lower than an encoding rate of the at least one other error correction code, and the receiver comprises an error correction decoder configured to decode the first error correction encoded signalling data to generate an estimate of the signalling data.

24. A receiver according to clause 23, wherein the signalling data has been encoded with an error correction code, an encoding rate of the error correction code being lower than rate one quarter, and the receiver comprises an error correction decoder configured to decode the error correction encoded signalling data to generate an estimate of the signalling data.

25. A method of detecting and recovering payload data from a received signal, the method comprising detecting the received signal, the received signal comprising the payload data and signalling data for use in detecting and recovering the payload data, the signalling data and the payload data forming frames in the received signal, the signalling data in each frame being carried by a first Orthogonal Frequency Division Multiplexed, OFDM, symbol, and the payload data being carried by one or more second OFDM symbols and a guard interval for the first OFDM symbol is selected in dependence upon the maximum allowable duration of the guard interval useable for the second OFDM symbol, demodulating the first OFDM symbol and the second OFDM symbol to recover the signalling data from the first OFDM symbol in the presence of the guard interval using a forward Fourier transform with respect to the number of sub-carriers of the first OFDM symbol, and using the signalling data to recover the payload data from the second OFDM symbol.

26. A method according to clause 25, wherein the number of sub-carriers of the first OFDM symbol is selected in dependence upon the size of the selected guard interval.

27. A method according to clause 25 or 26, wherein the number of sub-carriers of the first OFDM symbol is selected to increase a likelihood of a receiver being able to detect and recover data from the first OFDM symbol and the number of sub-carriers of the second OFDM symbol is selected to maximise spectral efficiency.

28. A method according to any of clauses 26, 27 or 28, wherein the number of sub-carriers in the second OFDM symbol is substantially thirty two thousand, sixteen thousand or eight thousand, and the number of sub-carriers of the first OFDM symbol is substantially eight thousand.

29. A method according to clause 28, wherein the guard interval is 19/32 or 19/64 of the duration of the first OFDM symbol.

30. A method according to any of clauses 25 to 29, wherein the received signal includes pilot symbols inserted on selected sub-carriers of the first OFDM symbol, the number of pilot symbol carrying sub-carriers being less than a number which would be required to estimate a channel impulse response through which the first OFDM symbol has been transmitted, and the method includes estimating a coarse frequency offset of the received first OFDM symbol, and compensating for the coarse frequency offset in the received signal.

31. A method according to any of clauses 25 to 30, wherein the signalling data has been encoded with a first error correction code and the payload data is encoded with at least one other error correction code, an encoding rate of the first error correction code being lower than an encoding rate of the at least one other error correction code, and the method comprises decoding the first error correction encoded signalling data to generate an estimate of the signalling data.

32. A method according to clause 31, wherein the signalling data has been encoded with an error correction code, an encoding rate of the error correction code lower than rate one quarter, and the method comprises decoding the error correction encoded signalling data to generate an estimate of the signalling data.

Various further aspects and features of the present disclosure are defined in the appended claims. Various combinations of features may be made of the features and method steps defined in the dependent claims other than the specific combinations set out in the attached claim dependency. Thus the claim dependencies should not be taken as limiting.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

The invention claimed is:

1. A transmitter for transmitting data to a receiver using Orthogonal Frequency Division Multiplexed (OFDM) symbols, the OFDM symbols including a plurality of sub-carrier symbols, some of the sub-carrier symbols carrying data symbols and some of the sub-carrier symbols carrying pilot symbols, the transmitter comprising:

circuitry configured to:
form data symbols with the data for transmission,
combine the data symbols with pilot symbols according to a predetermined pattern,
map the data symbols and the pilot symbols to modulation symbols and modulate the plurality of sub-carriers in accordance with the modulation symbols to form the OFDM symbols,
convert the OFDM symbols from the frequency domain to the time domain using an inverse Fourier transform,
add a guard interval to each OFDM symbol by copying a part of the OFDM symbol and appending the copied part to the OFDM symbol, the guard interval corresponding to a guard interval fraction of a number of sub-carriers of an OFDM symbol, and
transmit the OFDM symbols on a radio frequency carrier,
wherein:
the pilot sub-carriers for the OFDM symbols are formed from continual pilots in which pilot symbols are transmitted on the same sub-carriers of the OFDM symbols, and scattered pilots in which pilot symbols are transmitted on different sub-carriers of the OFDM symbols,
the guard interval fraction of an OFDM symbol is 3/512, 6/512, 12/512, 24/512, 48/512, 57/512 or 96/512, and a scattered pilot pattern SPDx_Dy for a given guard interval fraction is:
SP32_2, for 3/512;
SP16_2 or SP32_2, for 6/512;
SP8_2 or SP16_2 or SP32_2, for 12/512;
SP4_2 or SP4_4 or SP8_2 or SP16_2, for 24/512;
SP4_2 or SP4_4 or SP8_2, for 48/512;
SP4_2 or SP4_4 or SP8_2, for 57/512; and
SP4_2 or SP4_4, for 96/512,
where Dx is a spacing of sub-carriers which are used to carry scattered pilot symbols, and Dy is a spacing of successive OFDM symbols carrying scattered pilot symbols on the same sub-carrier.

2. The transmitter of claim 1, wherein the number of the plurality of sub-carriers of each of the OFDM symbols is one of substantially 8K, 16K or 32K.

3. The transmitter of claim 1, wherein the guard interval of an OFDM symbol includes 192, 384, 768, 1,536, 3,072 or 3,648 samples of the OFDM symbol.

4. A method of transmitting data to a receiver using Orthogonal Frequency Division Multiplexed (OFDM) symbols, the OFDM symbols including a plurality of sub-carrier symbols, some of the sub-carrier symbols carrying data symbols and some of the sub-carrier symbols carrying pilot symbols, the method comprising:

forming data symbols with the data for transmission,
combining the data symbols with pilot symbols according to a predetermined pattern,
mapping the data symbols and the pilot symbols to modulation symbols and modulating the plurality of sub-carriers in accordance with the modulation symbols to form the OFDM symbols,
converting the OFDM symbols from the frequency domain to the time domain using an inverse Fourier transform,
adding a guard interval to each OFDM symbol by copying a part of the OFDM symbol and appending the copied part to the OFDM symbol, the guard interval corresponding to a guard interval fraction of a number of sub-carriers of an OFDM symbol, and
transmitting the OFDM symbols on a radio frequency carrier,
wherein:
the pilot sub-carriers for the OFDM symbols are formed from continual pilots in which pilot symbols are transmitted on the same sub-carriers of the OFDM symbols, and scattered pilots in which pilot symbols are transmitted on different sub-carriers of the OFDM symbols,
the guard interval fraction of an OFDM symbol is 3/512, 6/512, 12/512, 24/512, 48/512, 57/512 or 96/512, and
a scattered pilot pattern SPDx_Dy for a given guard interval fraction is:
SP32_2, for 3/512;
SP16_2 or SP32_2, for 6/512;
SP8_2 or SP16_2 or SP32_2, for 12/512;
SP4_2 or SP4_4 or SP8_2 or SP16_2, for 24/512;
SP4_2 or SP4_4 or SP8_2, for 48/512;
SP4_2 or SP4_4 or SP8_2, for 57/512; and
SP4_2 or SP4_4, for 96/512,
where Dx is a spacing of sub-carriers which are used to carry scattered pilot symbols, and Dy is a spacing of successive OFDM symbols carrying scattered pilot symbols on the same sub-carrier.

5. A television receiver device, comprising: a receiver configured to receive data in Orthogonal Frequency Division Multiplexed (OFDM) symbols, the OFDM symbols including a plurality of sub-carrier symbols, some of the sub-carrier symbols carrying data symbols and some of the sub-carrier symbols carrying pilot symbols;
 a display; and
 circuitry configured to:
  determine a guard interval of each OFDM symbol, the guard interval of each OFDM symbol including a copy of a part of the OFDM symbol appended to the OFDM symbol, the guard interval corresponding to a guard interval fraction of a number of sub-carriers of an OFDM symbol;
  recover, by use of the guard interval, data symbols from data bearing sub-carriers of the OFDM symbol,
  wherein:
   the pilot sub-carriers for the OFDM symbols comprise continual pilots in which pilot symbols are present at the same sub-carriers of the OFDM symbols, and scattered pilots in which pilot symbols are present at different sub-carriers of the OFDM symbols,
   the guard interval fraction of an OFDM symbol is 3/512, 6/512, 12/512, 24/512, 48/512, 57/512, or 96/512, and
   a scattered pilot pattern SPDx_Dy for a given guard interval fraction is:
   SP32_2, for 3/512;
   SP16_2 or SP32_2, for 6/512;
   SP8_2 or SP16_2 or SP32_2, for 12/512;
   SP4_2 or SP4_4 or SP8_2 or SP16_2, for 24/512;
   SP4_2 or SP4_4 or SP8_2, for 48/512;
   SP4_2 or SP4_4 or SP8_2, for 57/512; and
   SP4_2 or SP4_4, for 96/512,
  where Dx is a spacing of sub-carriers which are used to carry scattered pilot symbols, and Dy is a spacing of successive OFDM symbols carrying scattered pilot symbols on the same sub-carrier;
  process the data symbols; and
  control the display in accordance with the processed data symbols.

6. The device of claim 5, wherein the number of the plurality of sub-carriers of each of the OFDM symbols is one of substantially 8K, 16K or 32K.

7. The device of claim 5, wherein the guard interval of an OFDM symbol includes 192, 384, 768, 1,536, 3,072 or 3,648 samples of the OFDM symbol.

8. The device of claim 5, wherein the pilot symbols are positioned on sub-carriers in the OFDM symbols to provide a sampling frequency which provides a Nyquist duration limit in the time domain which exceeds a temporal length of a transmission channel between a transmitter and the receiver.

9. The device of claim 8, wherein the Nyquist limit durations in the time domain is one of 37 μs, 75 μs, 149 μs, 299 μs, or 597 μs.

10. The device of claim 5, wherein the circuitry is further configured to:
 estimate an impulse response of a channel through which the OFDM symbols have passed using the pilot symbols, and
 correct the received data symbol bearing sub-carriers using the estimated channel impulse response.

11. The device of claim 5, wherein the circuitry is further configured to detect the timing of the OFDM symbols by correlating samples corresponding to the guard intervals of the OFDM symbols with samples of the respective OFDM symbols.

12. The device of claim 5, wherein a bandwidth of the OFDM symbols is substantially 6 MHz.

13. The device of claim 5, wherein the guard interval fraction is different for first OFDM symbols, the first OFDM symbols having been modulated with signaling data, and second OFDM symbols having been modulated with payload data, a guard interval for the first OFDM symbols having been selected based upon a longest possible guard interval of the second OFDM symbols.

14. A method, comprising: receiving data in Orthogonal Frequency Division Multiplexed (OFDM) symbols, the OFDM symbols including a plurality of sub-carrier symbols, some of the sub-carrier symbols carrying data symbols and some of the sub-carrier symbols carrying pilot symbols;
 determining a guard interval of each OFDM symbol, the guard interval of each OFDM symbol including a copy of a part of the OFDM symbol appended to the OFDM symbol, the guard interval corresponding to a guard interval fraction of a number of sub-carriers of an OFDM symbol,
 recovering, by use of the guard interval, data symbols from data bearing sub-carriers of the OFDM symbol,
 wherein:
  the pilot sub-carriers for the OFDM symbols comprise continual pilots in which pilot symbols are present at the same sub-carriers of the OFDM symbols, and scattered pilots in which pilot symbols are present at different sub-carriers of the OFDM symbols,
  the guard interval fraction of an OFDM symbol is 3/512, 6/512, 12/512, 24/512, 48/512, 57/512 or 96/512, and
  a scattered pilot pattern SPDx_Dy for a given guard interval fraction is:
  SP32_2, for 3/512;
  SP16_2 or SP32_2, for 6/512;
  SP8_2 or SP16_2 or SP32_2, for 12/512;
  SP4_2 or SP4_4 or SP8_2 or SP16_2, for 24/512;
  SP4_2 or SP4_4 or SP8_2, for 48/512;
  SP4_2 or SP4_4 or SP8_2, for 57/512; and
  SP4_2 or SP4_4, for 96/512,
 where Dx is a spacing of sub-carriers which are used to carry scattered pilot symbols, and Dy is a spacing of successive OFDM symbols carrying scattered pilot symbols on the same sub-carrier;
 processing the recovered data symbols; and
 controlling a display in accordance with the processed data symbols.

15. The method of claim 14, wherein the number of the plurality of sub-carriers of each of the OFDM symbols is one of substantially 8K, 16K , or 32K.

16. The method of claim 14, wherein the guard interval of an OFDM symbol includes 192, 384, 768, 1,536, 3,072, or 3,648 samples of the OFDM symbol.

17. The method of claim 14, wherein the pilot symbols are positioned on sub-carriers in the OFDM symbols to provide a sampling frequency which provides a Nyquist duration limit in the time domain which exceeds a temporal length of a transmission channel between a transmitter and a receiver.

18. The method of claim 17, wherein the Nyquist limit durations in the time domain is one of 37 μs, 75 μs, 149 μs, 299 μs, or 597 μs.

19. The method of claim 14, further comprising:
 estimating an impulse response of a channel through which the OFDM symbols have passed using the pilot symbols, and
 correcting the received data symbol bearing sub-carriers using the estimated channel impulse response.

20. The method of claim 14, wherein detecting the timing of the OFDM symbols includes correlating samples corresponding to the guard intervals of the OFDM symbols with samples of the respective OFDM symbols.

21. The method of claim 14, wherein a bandwidth of the OFDM symbols is substantially 6 MHz.

* * * * *